(12) United States Patent
Takagi

(10) Patent No.: US 12,508,831 B2
(45) Date of Patent: Dec. 30, 2025

(54) BOOKLET CREATING APPARATUS AND IMAGE FORMING SYSTEM

(71) Applicant: CANON KABUSHIKI KAISHA, Tokyo (JP)

(72) Inventor: Kenji Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/952,933

(22) Filed: Nov. 19, 2024

(65) Prior Publication Data

US 2025/0170848 A1    May 29, 2025

(30) Foreign Application Priority Data

Nov. 28, 2023 (JP) .................... 2023-200408

(51) Int. Cl.
*B42C 13/00* (2006.01)
*G03G 15/00* (2006.01)

(52) U.S. Cl.
CPC ......... *B42C 13/00* (2013.01); *G03G 15/6544* (2013.01); *G03G 15/6585* (2013.01); *G03G 2215/00835* (2013.01); *G03G 2215/00936* (2013.01)

(58) Field of Classification Search
CPC ......... G03G 2215/00936; G03G 2215/00835; G03G 15/6585; G03G 15/6544; B42C 13/00
See application file for complete search history.

(56) References Cited

U.S. PATENT DOCUMENTS

| | | | |
|---|---|---|---|
| 2009/0057977 A1* | 3/2009 | Kawaguchi | B65H 37/04 270/37 |
| 2012/0294695 A1* | 11/2012 | Sasaki | B42C 19/02 412/22 |
| 2013/0272817 A1* | 10/2013 | Kimura | B42C 9/0056 412/37 |
| 2015/0205243 A1* | 7/2015 | Yamazaki | B31F 5/02 399/408 |
| 2023/0002184 A1* | 1/2023 | Matsuda | B65H 37/06 |

FOREIGN PATENT DOCUMENTS

| | | |
|---|---|---|
| JP | 2014151579 A | 8/2014 |
| JP | 2014151640 A | 8/2014 |
| JP | 2018144317 A | 9/2018 |
| JP | 2023164082 A | 11/2023 |

* cited by examiner

*Primary Examiner* — David H Banh
(74) *Attorney, Agent, or Firm* — Canon U.S.A., Inc. IP Division

(57) ABSTRACT

A booklet creating apparatus includes a heating-and-pressing unit and a controller. The heating-and-pressing unit heats and presses adhesive layer in a state in which plural sheets, with the adhesive layer formed thereon, are stacked. The controller performs control in such a way as to make a predetermined temperature and/or pressure lower when heating and pressing sheets of minimum size than when heating and pressing sheets of maximum size.

10 Claims, 18 Drawing Sheets

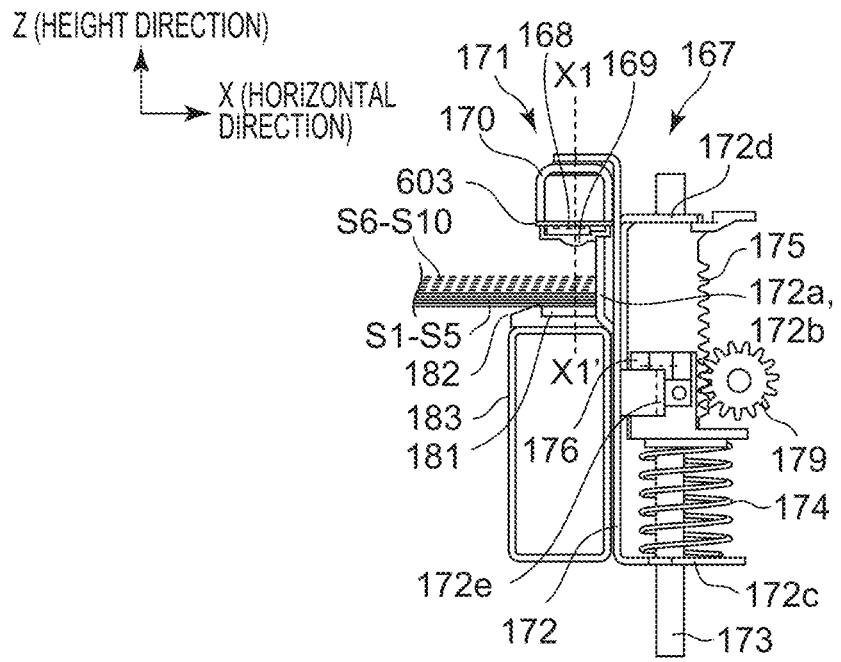

BOOKLET CREATING APPARATUS AND IMAGE FORMING SYSTEM

BACKGROUND

Field of the Disclosure

Some aspects of embodiments relate to a booklet creating apparatus configured to create a booklet by gluing a plurality of sheets together, and to an image forming system including the booklet creating apparatus.

Description of the Related Art

As disclosed in Japanese Patent Laid-Open No. 2014-151579, the following method for creating a booklet through adhesive bonding processing applied to a sheet stack is known: the sheet stack is made up of a plurality of sheets having been subjected to image forming processing by an image forming apparatus such as a printer or a copier; a booklet creating apparatus causes an adhesive toner to melt back, and glues the sheets together by means of the molten adhesive toner, thereby creating the booklet. As disclosed in Japanese Patent Laid-Open No. 2014-151579, a heating-and-pressing unit configured to heat and press the sheets by using a pressing portion that is in contact with a heating entity is also known.

When the image forming apparatus and the booklet creating apparatus support a plurality of sheet sizes, a thermal compression bonder of the booklet creating apparatus is required to be capable of heating and pressing sheets of maximum size (large-size paper). In a heating-and-pressing unit configured to make the distribution of a pressing force in the longer-side direction uniform when applying pressure to large-size paper, the pressing force concentrates at an edge portion of sheets of minimum size (small-size paper) when applying pressure to the small-size paper. When this occurs, there is a risk that a gap might be formed between the pressing portion and the heating entity due to the plastic deformation of the pressing portion.

As a result, it becomes harder for heat to transfer from the heating entity to a pressing plate of the pressing portion at a region where the gap exists. Since the quantity of the heat applied to the adhesive toner decreases at this region, there is a risk that the adhesive bonding property of a booklet might be impaired.

SUMMARY

The present disclosure provides a booklet creating apparatus and an image forming system that suppress, in a heating-and-pressing unit that supports a plurality of sheet sizes, plastic deformation of a pressing plate, and thus keep good adhesive bonding property of a booklet.

A booklet creating apparatus according to a certain embodiment includes a heating-and-pressing unit and a controller. The heating-and-pressing unit is configured to heat and press adhesive layer in a state in which plural sheets, with the adhesive layer formed thereon, are stacked. The heating-and-pressing unit includes a pressing plate, a heating entity, a receiving member, and a pressing mechanism. The pressing plate is configured to be brought into contact with the sheets and press the sheets. The heating entity is configured to heat the pressing plate at a predetermined temperature. The receiving member faces the pressing plate. The pressing mechanism is configured to apply pressure to the sheets sandwiched between the pressing plate and the receiving member. The controller is configured to control the predetermined temperature and the pressure. The booklet creating apparatus creates a booklet by sandwiching the sheets with the adhesive layer formed thereon between the pressing plate and the receiving member and by heating and pressing the adhesive layer formed on the sheets. The controller performs control in such a way as to make the predetermined temperature and/or the pressure lower when heating and pressing sheets of minimum size than when heating and pressing sheets of maximum size.

Further features of the present disclosure will become apparent from the following description of exemplary embodiments with reference to the attached drawings.

BRIEF DESCRIPTION OF THE DRAWINGS

FIGS. 10A to 10F are a set of diagrams illustrating operation of the heating-and-pressing unit according to one or more aspects of the present disclosure.

DESCRIPTION OF THE EMBODIMENTS

With reference to the drawings, some embodiments of the present disclosure will now be described. The term "image forming apparatus" as used herein encompasses a wide variety of apparatuses configured to form (record) an image on a recording material (recording medium) such as a single-function printer, a copier, a multi-function printer, a commercial printer, and the like. A system that includes an image forming apparatus and a booklet creating apparatus coupled thereto and configured to create a booklet by gluing a plurality of recording materials together is hereinafter referred to as "image forming system".

First Embodiment

Figure 1:
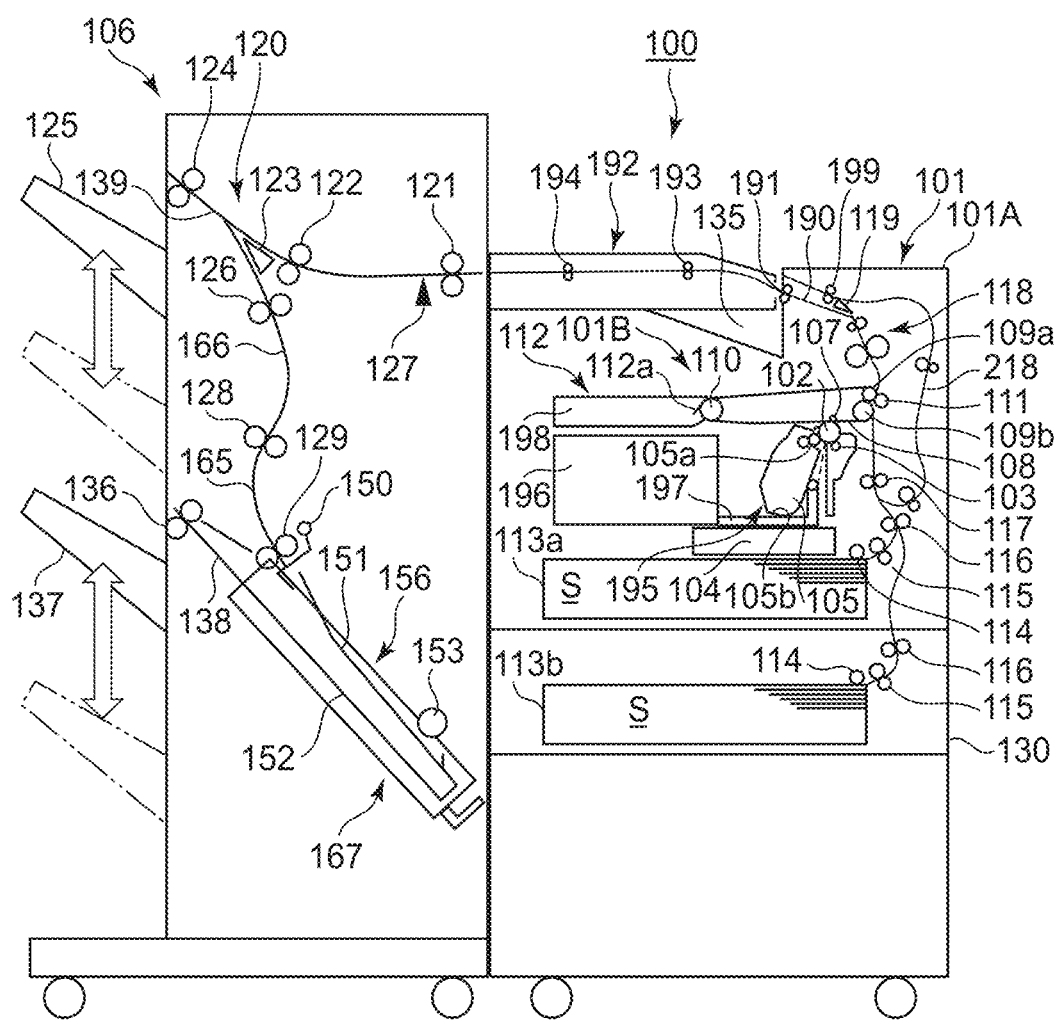
FIG. 1 is a schematic view of an image forming apparatus according to one or more aspects of the present disclosure.

With reference to FIGS. 1 to 10, an image forming system that includes an image forming apparatus and a booklet creating apparatus according to the present disclosure will now be described. The present disclosure shall not be construed to be limited to the embodiments described below. Replacement by other configurations can be made within the scope of the concept of the present disclosure. An image forming apparatus and a booklet creating apparatus according to the present embodiment will now be described using FIG. 1. FIG. 1 is a schematic view illustrating a cross section of an image forming apparatus 101 and a booklet creating apparatus 106 according to a first embodiment. An image forming system 100 is configured as a combination of the image forming apparatus 101 and the booklet creating apparatus 106. The image forming system 100 may be configured in various modes, including a mode according to which a part or a whole of a booklet creating function is incorporated in the image forming apparatus 101.

The image forming system 100 according to the present embodiment, just with a single-apparatus configuration, is capable of creating a booklet through printing and bookbinding by forming an image on sheets S, one by one, using the image forming apparatus 101, and then by performing thermal compression bonding of the plurality of sheets S using the booklet creating apparatus 106. Various kinds of sheet medium different in size and material can be used as the sheet S, for example, paper such as plain paper or thick paper, a surface-treated sheet medium such as coated paper, a plastic film, a cloth, a special-shaped sheet medium such as an envelope or an index sheet, or the like. A sheet conveyance speed according to the present embodiment is 300 mm/sec. A maximum grammage of the sheet S is 90 g/m$^2$.

Main Body of Image Forming Apparatus

The image forming apparatus 101 is an electrophotographic apparatus that includes a housing 101A and an electrophotographic image forming section 101B housed in the housing 101A. The image forming section 101B is an intermediate-transfer-type electrophotographic unit, and includes a primary transfer roller 107, an intermediate transfer belt 108, which is an example of an intermediate transfer member, and a process cartridge 195 disposed along the intermediate transfer belt 108. The process cartridge 195 includes a photosensitive drum 102, which is an example of an image bearing member, a charging device 103, which is an example of a charging component, and a development unit 105, which is an example of a developing component. The image forming section 101B further includes a scanner unit 104, which is an example of an exposing component. The development unit 105 includes a development roller 105a, which is an example of the developing component, and a toner container 105b, in which a toner (developer) is contained. The development roller 105a is supported rotatably by the toner container 105b.

The process cartridge 195 can be detachably attached to the housing 101A. A toner cartridge 196, which contains a toner to be supplied to the development unit 105, is detachably mounted in the image forming apparatus 101. The "housing 101A" of the image forming apparatus 101 means a portion excluding the process cartridge 195 and the toner cartridge 196 from the image forming apparatus 101. The housing 101A includes a frame member such as a metal frame constituting the frame body of the image forming apparatus 101, and members fixed to this frame body, and forms a mounting space into which the process cartridge 195 and the toner cartridge 196 are mounted. By using a toner, the process cartridge 195 forms a toner image for image recording on the sheet S and forms an adhesive-use toner image functioning as a powdery adhesive for gluing the sheets S together. The image forming apparatus 101 according to the present embodiment has a configuration of a monochrome printer configured to record a monochrome image. The image forming apparatus 101 uses a black toner not only as a toner for image-recording purpose but also as a toner for adhesive purpose (an adhesive). Though the configuration of a monochrome printer that includes a single cartridge only and uses a toner both for the purpose of recording and for the purpose of adhesive bonding is described in the present embodiment, this does not imply any limitation. A dedicated toner used exclusively for the purpose of adhesive bonding may be used. A configuration that makes it possible to mount a plurality of cartridges may be adopted so as to make it possible to perform image forming of a plurality of colors and perform adhesive bonding for booklet creation. When this configuration is adopted, the toner for adhesive use may be a toner other than a black toner, or may be a dedicated toner used exclusively for adhesive purpose separately from the toner used for recording an image.

The toner cartridge 196 and the process cartridge 195 that are mounted in the housing 101A are connected to each other through a toner-conveying pipe 197. The toner cartridge 196 is capable of supplying a toner for replenishment to the development unit 105 through the toner-conveying pipe 197. A cassette 113a (also called "sheet tray", "storage container"), which is an example of a sheet storage portion configured to store the sheets S to be used for forming an image, is mounted under the scanner unit 104 in such a way as to be able to be drawn out of the housing 101A. One or more optional sheet feeding apparatuses 130 including an additional cassette(s) 113b may be coupled to the lower portion of the housing 101A.

The intermediate transfer belt 108 is a movable (rotatable) endless belt stretched on and around a drive roller 109a, a stretching roller 109b, and a tension roller 110, which are configured to rotate on axial lines parallel to one another. Driven by rotation of the drive roller 109a, the intermediate transfer belt 108 moves (turns, performs conveyor action) counterclockwise in the figure. The primary transfer roller 107, which is an example of a primary transfer member, is disposed on the inner surface of the intermediate transfer belt 108 at a position where it faces the photosensitive drum 102, with the intermediate transfer belt 108 interposed therebetween. A secondary transfer roller 111, which is an example of a secondary transfer member, is disposed on the outer surface of the intermediate transfer belt 108 at a position where it faces the drive roller 109a, with the intermediate transfer belt 108 interposed therebetween. A secondary transfer section, which is an example of a transfer section, is formed as a nip between the intermediate transfer belt 108 and the secondary transfer roller 111. The intermediate transfer belt 108, the primary transfer roller 107, and the secondary transfer roller 111 constitute a transferring component configured to transfer the toner image having been formed on the photosensitive drum 102, which is an example of the image bearing member, onto the sheet S. A belt cleaner 112, which is an example of a cleaning component configured to clean the intermediate transfer belt 108, is provided at a position where it faces the tension roller 110, with the intermediate transfer belt 108 interposed therebetween. The belt cleaner 112 includes a cleaning member 112a such as a blade or a brush disposed in contact with the intermediate transfer belt 108, and a waste toner container 198 functioning as a collection container. The belt cleaner 112 removes dregs such as an un-transferred residual toner from the intermediate transfer belt 108 by using the cleaning member 112a, and collects the removed toner, etc. to the waste toner container 198. A fixing device 118, which is an example of a fixing component, is disposed over the secondary transfer section inside the housing 101A. The fixing device 118 has a thermal-fixing configuration of fixing a toner image by applying heat. The fixing device 118 includes a pair of rotary members (for example, a roller pair made up of a fixing roller and a pressing roller) configured to nip and convey the sheet S, and a heat source (for example, a halogen lamp, an induction heating mechanism) configured to heat a toner image on the sheet S via the fixing roller.

Image Forming Operation

When the image forming apparatus 101 performs image forming operation, the sheet S is fed by a feeding roller 114 functioning as a pickup feeder either from the cassette 113 in the lower portion of the housing 101A or from the cassette 113 of the sheet feeding apparatus 130. A pair of separation rollers 115 conveys the fed sheets S one by one while performing multiple-fed sheet separation. The sheet S is conveyed by a pulling roller 116 toward a pair of registration rollers 117. A skew of the sheet S is corrected as a result of collision of the leading edge of the sheet S with a nip of the pair of registration rollers 117 that is in a stopped state. The pair of registration rollers 117 sends the sheet S to the secondary transfer section at a timing synchronized with the progress of a toner image forming process executed by the image forming section 101B.

Meanwhile, at the image forming section 101B, the photosensitive drum 102 and the intermediate transfer belt 108 turn. The charging device 103 charges the surface of the photosensitive drum 102 uniformly. The scanner unit 104 writes an electrostatic latent image by irradiating the photosensitive drum 102 with laser light on the basis of image information that represents an image to be recorded on the sheet S. The development unit 105 performs development using a black toner, thereby developing (visualizing) this electrostatic latent image as a black toner image. In a case where thermal compression bonding to be described later is performed by the booklet creating apparatus 106, the scanner unit 104 writes an electrostatic latent image by irradiating the photosensitive drum 102 with laser light on the basis of information that specifies the position of adhesive bonding of the sheets S. As a result of the development of this electrostatic latent image by using the black toner by the development unit 105, an adhesive-use toner image is formed on the photosensitive drum 102 at an area corresponding to the position of adhesive bonding on the sheet S.

The toner image having been formed on the photosensitive drum 102 is transferred (primarily transferred) onto the intermediate transfer belt 108 by the primary transfer roller 107, and is then conveyed toward the secondary transfer section due to the turning of the intermediate transfer belt 108. Then, at the secondary transfer section, a voltage is applied to the secondary transfer roller 111 to cause a transfer (secondary transfer) of the toner image onto the sheet S coming from the pair of registration rollers 117. The sheet S having passed through the secondary transfer section is sent to the fixing device 118. Heat is applied to the toner image while the sheet S passes through the nip between the fixing roller and the pressing roller, causing the softening of the toner. The toner thereafter solidifies, as a result of which the image becomes fixed on the sheet S.

The conveyance path of the sheet S having passed through the fixing device 118 is switched by a switcher 119. In a case where simplex printing is performed, the sheet S is guided by the switcher 119 onto an ejection path 190, and is ejected out of the housing 101A by a pair of ejection rollers 191. In the present embodiment, the image forming apparatus 101 is coupled to the booklet creating apparatus 106 via a relay conveyance unit 192. The sheet S having been ejected from the pair of ejection rollers 191 is handed over to the booklet creating apparatus 106 via a pair of conveyance rollers 193 and a pair of conveyance rollers 194 of the relay conveyance unit 192. In a case where the relay conveyance unit 192 and the booklet creating apparatus 106 are not coupled, the pair of ejection rollers 191 ejects the sheet S as a print output onto a sheet-stacking tray 135 provided at the top portion of the housing 101A. In a case where duplex printing is performed, the sheet S on the first surface of which an image has been formed is guided by the switcher 119 to a pair of reversing rollers 199. Then, the sheet S, after reverse conveyance (switchback conveyance) by the pair of reversing rollers 199, is conveyed toward the pair of registration rollers 117 via a duplex conveyance path 218. An image is formed on the second surface, which is the opposite of the first surface, of the sheet S by passing through the secondary transfer section and the fixing device 118. The sheet S is thereafter ejected out of the housing 101A by the pair of ejection rollers 191.

Figure 2A:
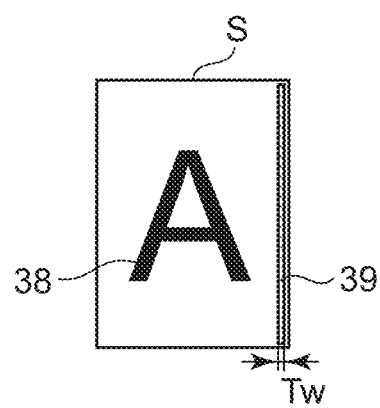
FIG. 2A is a diagram illustrating a toner image formed on a sheet by the image forming apparatus according to one or more aspects of the present disclosure.
Figure 2B:
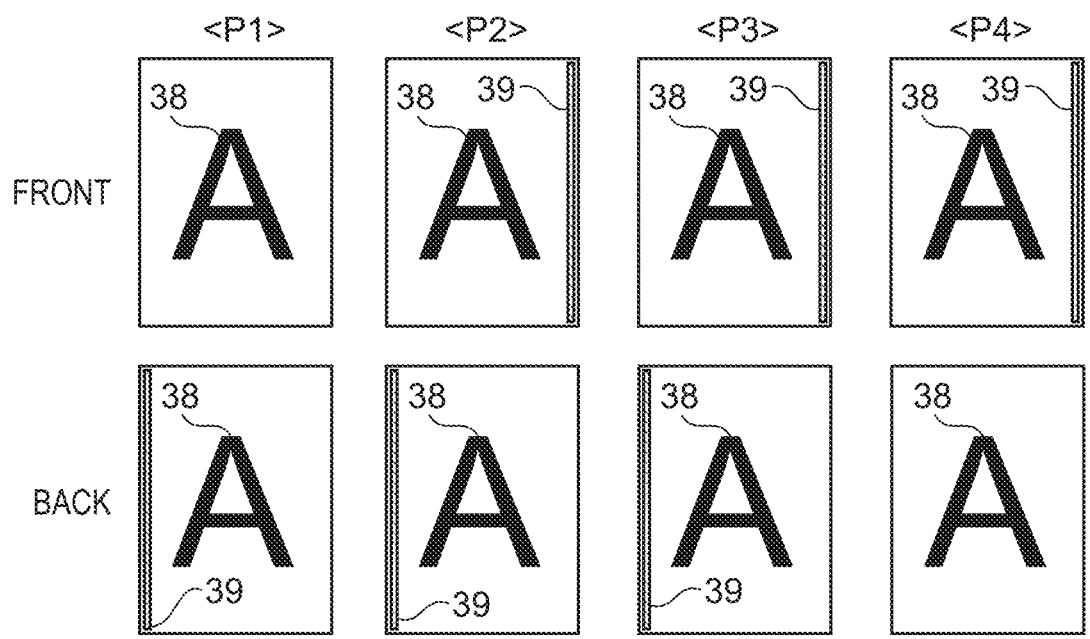
FIG. 2B is a diagram illustrating an image layout of eight sheet faces when a booklet made up of duplex-printed four sheets according to one or more aspects of the present disclosure is created.

FIG. 2A is a diagrammatic sketch illustrating an example of toner images formed on the sheet S. On the illustrated sheet S, a toner image (a recording-use toner image) 38 for recording an image such as a text, a figure, a photograph, and/or the like, and a toner image (an adhesive-use toner image) 39 for gluing sheets together, are formed. In the present embodiment, the adhesive-use toner image 39 has a width Tw of 4.0 mm, and has a toner amount per unit area (coverage amount) of 0.40 mg/cm$^2$. The toner amount is an amount measured in a yet-to-be-fixed state that is after the secondary transfer but before the fixing processing. The position, shape, area size, and the like of the adhesive-use toner image 39 can be changed depending on the configuration of a heating-and-pressing unit 167 to be described later and depending on the size of the sheet S. When the image forming apparatus 101 creates a booklet, in the present embodiment, the adhesive-use toner image 39 is basically formed on both sides of each sheet S, except for the front cover and the back cover of the booklet. FIG. 2B is a diagram illustrating an image layout of eight sheet faces when a booklet made up of duplex-printed four sheets S according to the present embodiment is created (i.e., four sheets×two sheet faces). The adhesive-use toner image 39 is formed on each of six sheet faces of the booklet according to the present embodiment, except for the front cover (i.e., the front face of the first sheet) and the back cover (i.e., the back face of the fourth sheet) thereof. Though duplex printing is assumed in the present embodiment, this does not imply any limitation. For example, the adhesive-use toner image 39 may be formed only on the front face of each sheet.

Constitution, Manufacturing Method, and Measurement Method of Toner

Next, the constitution of a toner used in the present embodiment containing a thermoplastic resin as its main component will be described. Examples of the thermoplastic resin include polyester resin, vinyl resin, acrylic resin, styrene acrylic resin, polyethylene, polypropylene, polyolefin, ethylene-vinyl acetate copolymer resin, ethylene-acrylic acid copolymer resin, and the like. The toner may contain two or more of these kinds of resin. The toner may contain a wax. Known waxes, such as ester waxes, which are esters of alcohol and acid, hydrocarbon waxes such as paraffin wax, and the like, can be used as the wax. The toner contains a black colorant, and may contain a magnetic material, a charge control agent, a wax, and an external additive. For forming a toner-based adhesive portion on a sheet by using an electrophotographic method, the toner should have a weight-average particle diameter that is within a preferred range of not less than 5.0 µm and not greater than 30.0 µm, or more preferably, not less than 6.0 µm and not greater than 20.0 µm.

An example of manufacturing the toner will now be described.

Styrene: 75.0 parts
N-butyl acrylate: 25.0 parts
Polyester resin: 4.0 parts
(Polyester Resin Having a Weight-Average Molecular Weight (Mw) of 20000, a Glass Transition Temperature (Tg) of 75° C., and an Acid Value of 8.2 mgKOH/g)
Ethylene glycol distearate: 14.0 parts
(Ester Wax Obtained by Esterification of Ethylene Glycol and Stearic Acid)
Hydrocarbon wax (HNP-9, manufactured by Nippon Seiro Co., Ltd): 2.0 parts
Divinylbenzene: 0.5 parts A mixture obtained by mixing the above-mentioned materials was kept at 60° C., and stirred at 500 rpm with a T.K. homomixer (manufactured by Tokushu Kika Kogyo Co., Ltd.) to be uniformly dissolved, thereby preparing a polymerizable monomer composition. On the other hand, 850.0 parts of 0.10 mol/L-Na$_3$PO$_4$ aqueous solution and 8.0 parts of 10% hydrochloric acid were put into a vessel equipped with a high-speed stirrer CLEARMIX (manufactured by M Technique Co., Ltd), and the mixture was heated to 70° C., with the number of revolutions adjusted to 15000 rpm. Then, 127.5 parts of 1.0 mol/L-CaCl$_2$) aqueous solution was added to this mixture to prepare an aqueous medium containing a calcium phosphate compound. After the above-described polymerizable monomer composition was put into this aqueous medium, 7.0 parts of t-butyl peroxypivalate as a polymerization initiator was added, and granulation was performed for 10 minutes while keeping the number of revolutions at 15000 rpm. After that, the stirrer was switched from the high-speed one to propeller stirring blades, reaction was allowed to proceed for five hours at a temperature of 70° C. while reflux was being performed, followed by further reaction for two hours at a temperature of 85° C. After the completion of the polymerizing reaction, the obtained slurry was cooled. Then, hydrochloric acid was added to the slurry to adjust its pH to 1.4, and calcium phosphate salt was dissolved by performing stirring for one hour. After that, washing with water whose amount was three times as large as that of the slurry, filtering, and drying were performed, and then, classification was performed to obtain toner particles. After that, 2.0 parts of silica fine particles (number average particle diameter of primary particles: 10 nm) (BET specific surface area: 170 m$^2$/g) having been hydrophobized with dimethyl silicone oil (20% by mass) were added as an external additive to 100.0 parts of the toner particles, and they were mixed at 3000 rpm for 15 minutes using a Mitsui Henschel mixer (manufactured by Mitsui Miike Machinery Co., Ltd.) to obtain the toner. The weight-average particle diameter of the obtained toner was 7.0 µm.

A method for measuring the storage elastic modulus as the viscoelasticity of the toner will now be described. The storage elastic modulus of the toner is measured using a dynamic viscoelasticity measuring apparatus (rheometer) ARES (manufactured by Rheometric Scientific).

Measurement jig: A serrated-type parallel plate having a diameter of 7.9 mm is used.

Measurement sample: Using a pressure molding machine, a test piece having a weight of 0.1 g is molded into a columnar sample having a diameter of 8 mm and a height of 2 mm (15 kN is maintained at room temperature for one minute). As the pressure molding machine, a 100 kN press NT-100H manufactured by NPa System Co., Ltd. is used.

The temperature of the serrated-type parallel plate is adjusted to 120° C., the columnar sample is melted by heating to cause the serration to bite into the sample, and a load is applied in the vertical direction such that an axial force does not exceed 30 gf (0.294 N) to fix the sample to the serrated-type parallel plate. At this time, a steel belt may be used so as to make the diameter of the sample equal to the diameter of the parallel plate. The serrated-type parallel plate and the columnar sample are slowly cooled down to a measurement start temperature of 30.00° C. over one hour.

Measurement frequency: 6.28 radian/sec.

Setting of measurement strain: The initial value is set to 0.1%, and measurement is performed in the automatic measurement mode.

Sample elongation correction: Adjustments are made in the automatic measurement mode.

Measurement temperature: The temperature is raised at a rate of 2° C. per minute from 30° C. to 140° C.

Measurement intervals: Viscoelasticity measurement data are acquired at intervals of 30 seconds, namely, at 1° C. intervals.

Figure 3:
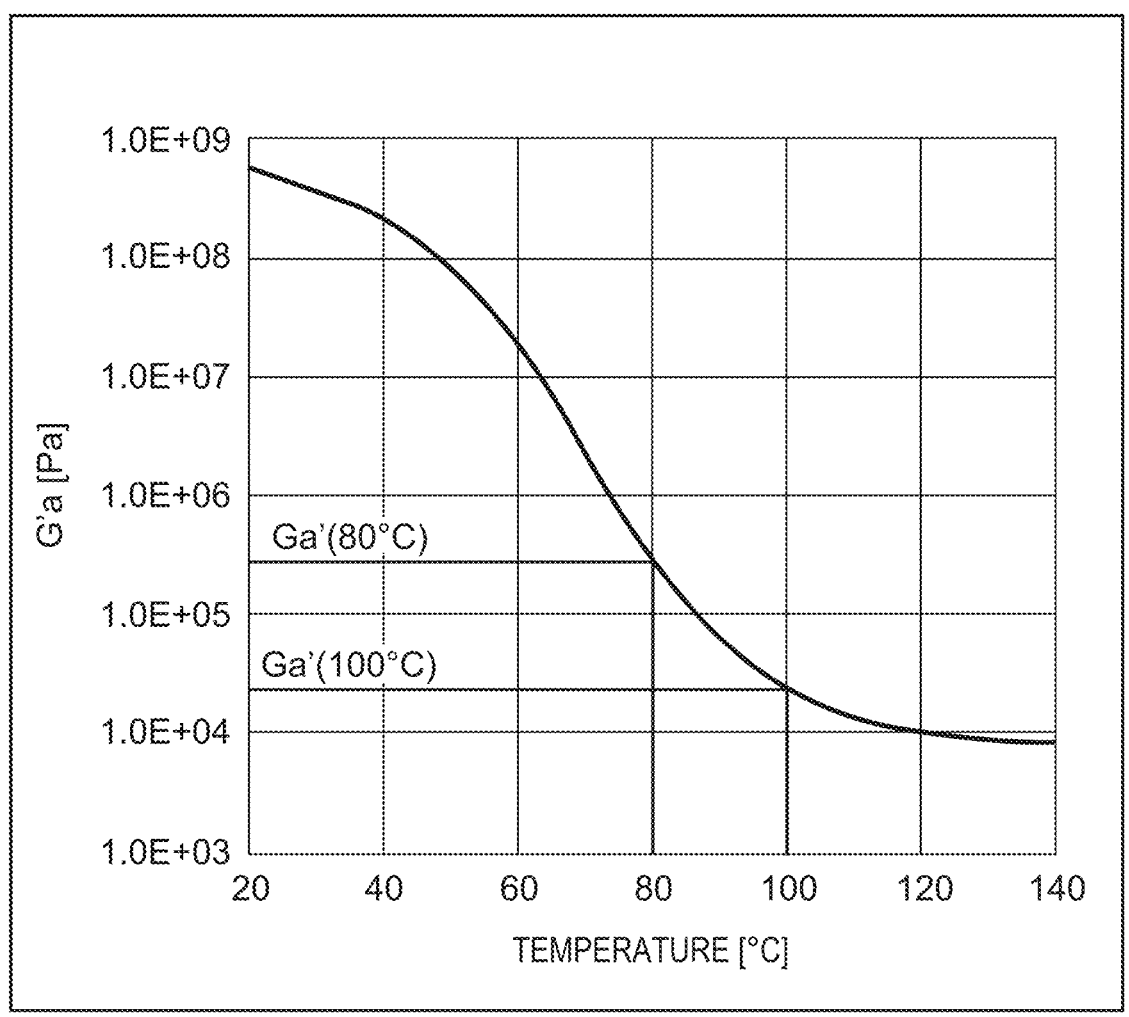
FIG. 3 is a graph illustrating the measurement results of the storage elastic modulus of a toner.

FIG. 3 is a graph illustrating the results of the measurement of the storage elastic modulus of the toner. As the representative values of the measurement results, a storage elastic modulus at 100° C. denoted as Ga' (100° C.)=2.2×10$^4$ Pa and a storage elastic modulus at 80° denoted as Ga' (80° C.)=3.2×10$^5$ Pa were acquired. The reason why the value at 100° C. was selected is that the temperature of a toner on the sheet S at the time of fixing is high at 100° C. or so due to a temperature rise in the process of passing through a fixing nip portion 6N of the fixing device 118. The reason why the value at 80° C. was selected is that the minimum toner temperature for bonding five sheets, which are sheets of the maximum number, together at one time in the process of sheet stack bonding processing performed by the heating-and-pressing unit 167 is 80° C. or so.

Booklet Creating Apparatus

In FIG. 1, the booklet creating apparatus 106 includes a buffer unit 120 configured to put a plurality of sheets S one on top of another and operating as an example of a buffer, an alignment unit 156 configured to edge-align the plurality of sheets S and operating as an example of an aligner, and a heating-and-pressing unit 167 configured to bond the sheets S to one another by means of thermal compression bonding. The heating-and-pressing unit 167 is an example of a sheet adhesive bonding apparatus (an adhesive bonding unit, an adhesive bonder, a thermal compression bonder, a pasting processor) configured to glue the sheets together. The booklet creating apparatus 106 further includes an upper ejection tray 125 and a lower ejection tray 137, each of which is configured to be able to move up and down, as ejection destinations where a print-processed output of the image forming system 100 can be ejected.

The booklet creating apparatus 106 is an apparatus that receives the plurality of sheets S on which images have been formed one by one by the image forming apparatus 101, performs bonding processing (thermal compression bonding), and then ejects the processing result as a stack of sheets (booklet). The buffer unit 120, the alignment unit 156, and the heating-and-pressing unit 167 will be described in detail later. The booklet creating apparatus 106 is not only capable of performing the above-described processing but also capable of ejecting the sheets S on which the images have been formed by the image forming apparatus 101 to the upper ejection tray 125 or the lower ejection tray 137 without performing any further processing thereon.

Buffer Unit

Figure 4:
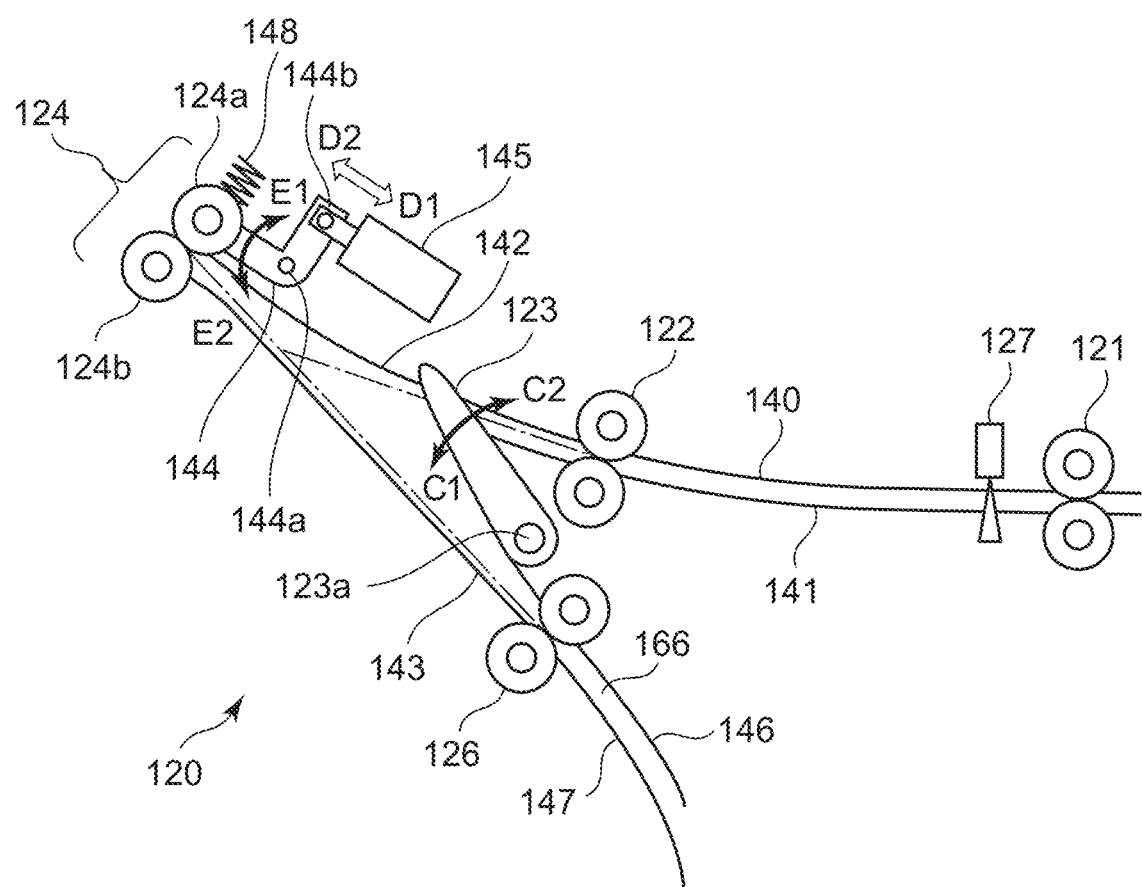
FIG. 4 is a diagram illustrating a buffer unit of a booklet creating apparatus according to one or more aspects of the present disclosure.

With reference to FIG. 4, the buffer unit 120 will now be explained. FIG. 4 is a cross-sectional enlarged view of the buffer unit 120. The buffer unit 120 includes a pair of gateway rollers 121, a pair of pre-buffer rollers 122, a non-return valve 123, a pair of reversing rollers 124, and a pair of internal ejection rollers 126. The buffer unit 120 further includes a gateway sensor 127 configured to perform sheet detection and a separation mechanism including a plunger solenoid 145 and the like for the purpose of opening and closing the pair of reversing rollers 124 (bringing the rollers into contact with, and away from, each other). Each of the pair of gateway rollers 121, the pair of pre-buffer rollers 122, the pair of reversing rollers 124, and the pair of internal ejection rollers 126 is a pair of rollers configured to nip and convey a sheet. The pair of gateway rollers 121 and the pair of pre-buffer rollers 122 are disposed on a conveyance path (entrance path) where the booklet creating apparatus 106 receives the sheet S coming in. The pair of reversing rollers 124 is disposed on a conveyance path 139 (see FIG. 1) that leads to the upper ejection tray 125. The pair of internal ejection rollers 126 is disposed on a conveyance path (internal ejection path 166, see FIG. 1) that leads from the pair of reversing rollers 124 toward the heating-and-pressing unit 167. The booklet creating apparatus 106 includes an ejection conveyance path 138 (see FIG. 1) that leads from the heating-and-pressing unit 167 toward the lower ejection tray 137. The entrance path is formed of an upper entrance guide 140 and a lower entrance guide 141. The first ejection path is formed of an upper reversing guide 142 and a lower reversing guide 143. The internal ejection path 166 is formed of an upper internal ejection guide 146 and a lower internal ejection guide 147. The gateway sensor 127 is disposed in such a way as to detect the sheet received by the pair of gateway rollers 121. The following reflective-type photo sensor, for example, can be used as the gateway sensor 127: a reflective-type photo sensor configured to determine whether the sheet S is present or absent by applying infrared light to the entrance path through an opening provided in the upper entrance guide 140 and detecting reflected light coming back from the sheet S.

A hole having a diameter not less than a spot diameter of the infrared light emitted by the gateway sensor 127 may be provided in the lower entrance guide 141 so that no infrared light will be reflected when no sheet is passing along the entrance path.

The non-return valve 123 is disposed downstream of the pair of pre-buffer rollers 122 in the sheet conveyance direction at the entrance path. The non-return valve 123 is disposed in such a way as to be able to rotate freely on its rotation shaft 123a with respect to the upper internal ejection guide 146. The non-return valve 123 is capable of moving to a first position and a second position. The first position is a position for preventing sheet movement (returning) from the first ejection path to the entrance path. The second position is a position for tolerating sheet movement from the entrance path to the first ejection path. The non-return valve 123 is urged by a non-illustrated spring in a C2 direction from the second position toward the first position. The non-return valve 123 is configured to move in a C1 direction from the first position toward the second position by being pushed by a sheet and, upon the passing of the sheet, return to the first position. When viewed in the direction of the rotational axis of the non-return valve 123, the tip portion of the non-return valve 123 located at the first position overlaps with the upper reversing guide 142. The tip portion of the non-return valve 123 has a comb-teeth shape that enables overlapping with the upper reversing guide 142. When viewed in the direction of the rotational axis of the non-return valve 123, a space where a sheet can pass is formed between the non-return valve 123 located at the second position and the upper reversing guide 142.

The pair of reversing rollers 124 is made up of an upper reversing roller 124a and a lower reversing roller 124b, to both of which a driving force is supplied. The upper reversing roller 124a and the lower reversing roller 124b are configured such that their rotations are always in sync. A separating lever 144 is connected to the upper reversing roller 124a. The separating lever 144 is supported in such a way as to be able to rotate freely on its lever fulcrum shaft 144a with respect to the upper reversing guide 142. The separating lever 144 is connected rotatably to the plunger solenoid 145 at its solenoid connection shaft 144b.

When an electric current flows to the plunger solenoid 145, a core moves in a D1 direction illustrated in this figure and, therefore, the separating lever 144 turns in an E1 direction illustrated in this figure. In this case, the pair of reversing rollers 124 is in a separated state (a nip-opened state), in which the upper reversing roller 124a and the lower reversing roller 124b are not in contact with each other. When the electric current flowing to the plunger solenoid 145 stops, due to an urging force of a pressing spring 148, the upper reversing roller 124a moves in an E2 direction, and the core of the plunger solenoid 145 moves in a D2 direction. In this case, the pair of reversing rollers 124 is in a contact state (a nip-formed state), in which the upper reversing roller 124a and the lower reversing roller 124b are in contact with each other.

Buffer Operation

Next, the operation of the buffer unit 120 will now be explained. FIGS. 5A to 5H are diagrams illustrating the operation of the buffer unit 120. In the description below, it is assumed that sheets come to the booklet creating apparatus 106 from the image forming apparatus 101 in the order of a sheet S1, a sheet S2, and a sheet S3. As will be described below, the buffer unit 120 performs operation of putting a new incoming sheet on top of another sheet (a stack) while moving the sheets (the stack) back and forth between the pair of reversing rollers 124 and the pair of internal ejection rollers 126 (this operation will be hereinafter referred to as "buffer operation"). The booklet creating apparatus 106 increases the speed of sheet conveyance inside the apparatus itself. In the description below, the speed of sheet conveyance by the pair of gateway rollers 121 will be denoted as V1, and the speed of sheet conveyance by the pair of pre-buffer rollers 122, the pair of reversing rollers 124, and the pair of internal ejection rollers 126 (the speed of conveyance after the acceleration) will be denoted as V2.

Figure 5A:
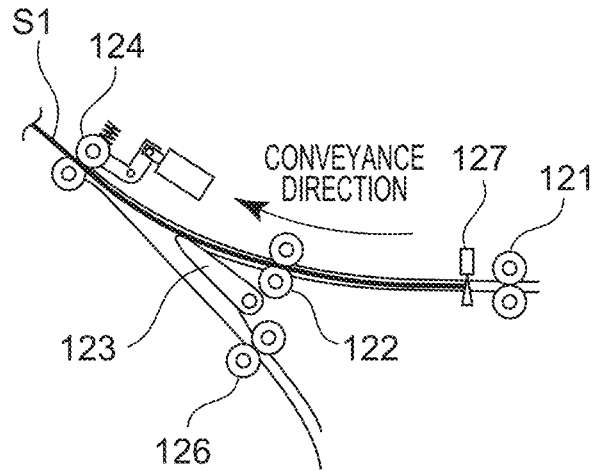
FIGS. 5A to 5H are a set of diagrams illustrating operation of the buffer unit according to one or more aspects of the present disclosure.
Figure 5B:
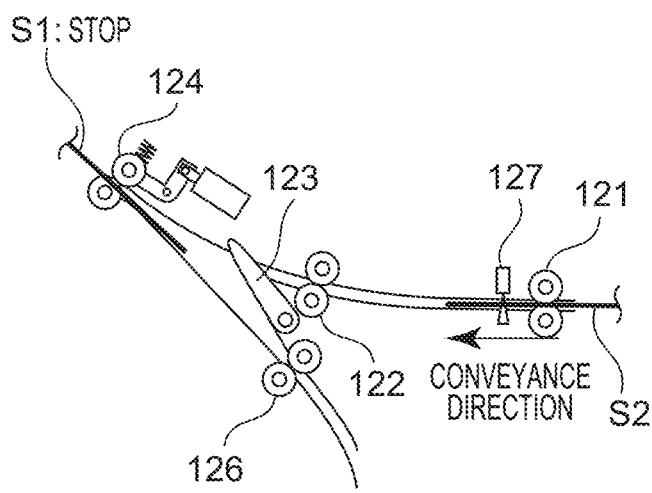
Figure 5C:
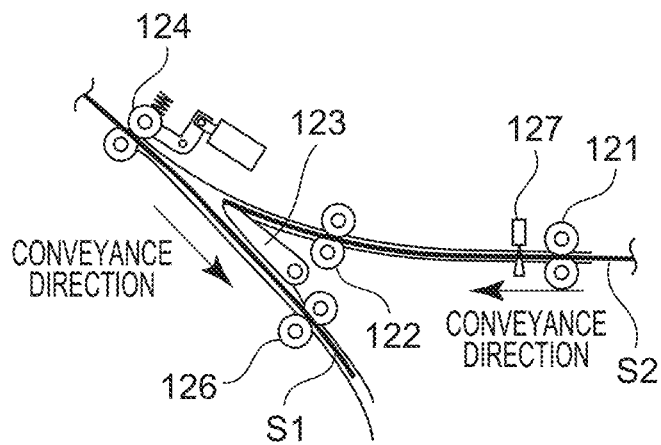
Figure 5D:
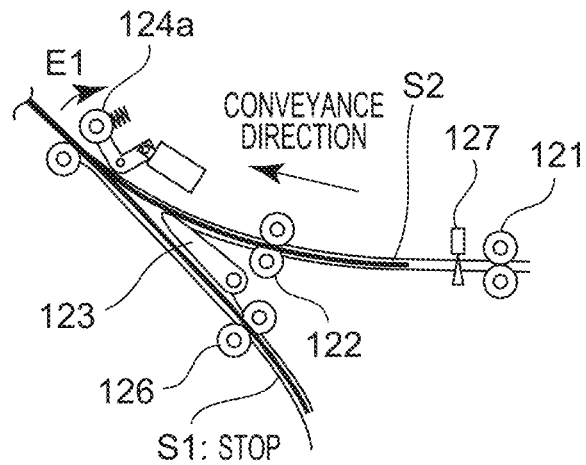
Figure 5E:
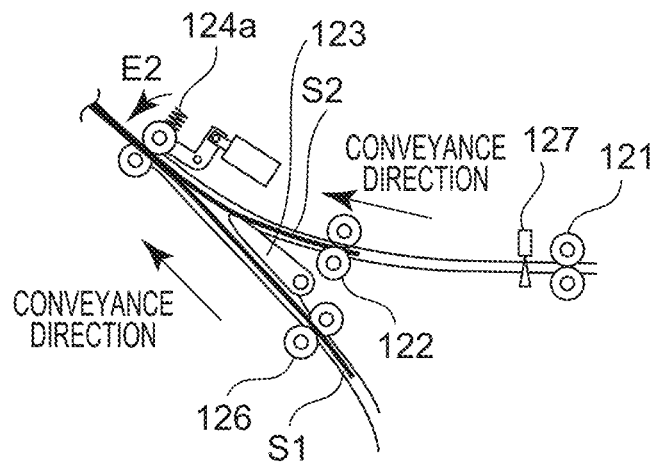
Figure 5F:
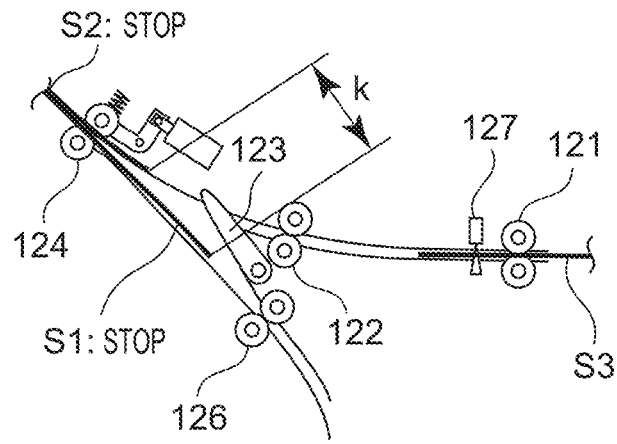
Figure 5G:
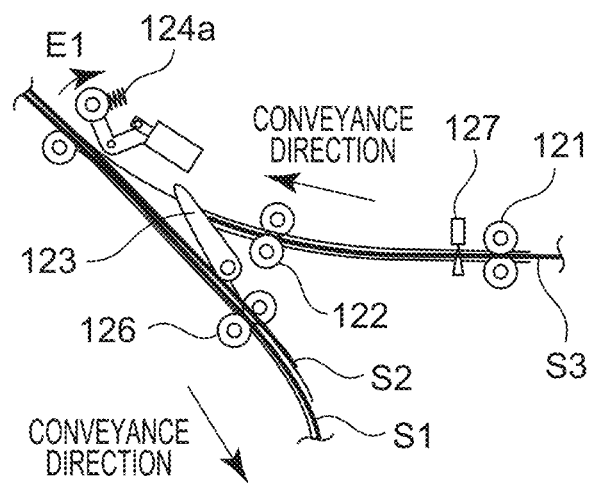
Figure 5H:
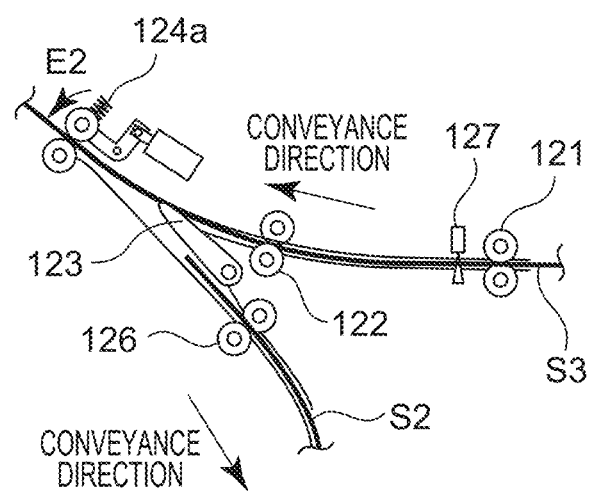

As illustrated in FIG. 5A, after the passing of the trailing edge of the sheet S1, which is the preceding one, through the gateway sensor 127, the speed of conveyance of the sheet S1 by the pair of pre-buffer rollers 122 and the pair of reversing rollers 124 is increased from V1 to V2. Because of this acceleration, the interval of conveyance between the sheet S1 and the sheet S2, which is the succeeding one, widens. This makes it possible for the pair of reversing rollers 124 to perform a switchback of the sheet S1 without a collision of the sheet S2 with the sheet S1. As illustrated in FIG. 5B, after the trailing edge of the sheet S1 leaves the non-return valve 123, the conveyance by the pair of reversing rollers 124 is temporarily stopped. As illustrated in FIG. 5C, the pair of reversing rollers 124 changes its direction of rotation and then conveys the sheet S1 toward the pair of internal ejection rollers 126. As illustrated in FIG. 5D, the conveyance of the sheet S1 by the pair of reversing rollers 124 and the pair of internal ejection rollers 126 is stopped at a position where the leading edge of the sheet S1 is located beyond the pair of internal ejection rollers 126 by a predetermined amount of conveyance after passing therethrough. In addition, after the sheet S1 is nipped by the pair of internal ejection rollers 126, the upper reversing roller 124a moves in the E1 direction. This puts the pair of reversing rollers 124 into a separated state, in which the sheet S2, the succeeding one, is receivable. After the separating operation of the upper reversing roller 124a, the sheet S2, the succeeding one, is conveyed to the pair of reversing rollers 124. As illustrated in FIG. 5E, after the passing of the trailing edge of the sheet S2, the succeeding one, through the gateway sensor 127, the speed of conveyance of the sheet S2 is increased from V1 to V2, similarly to the sheet S1. At a timing when the sheet S2 arrives at a predetermined target position, the pair of internal ejection rollers 126 conveys the sheet S1 toward the pair of reversing rollers 124. At a timing when the speed of conveyance of the sheet S1 and the speed of conveyance of the sheet S2 become substantially equal to each other (i.e., when a speed difference therebetween becomes substantially zero), the upper reversing roller 124a moves in the E2 direction to bring the pair of reversing rollers 124 into a contact state. The pair of reversing rollers 124, when brought into a contact state, nips the sheet S1 and the sheet S2 simultaneously. The pair of reversing rollers 124 undergoes a speed adjustment in such a way as to achieve equality in the speed of conveyance of the sheet S1, S2 no later than switching to a contact state from a separated state. As illustrated in FIG. 5F, after the trailing edge of the sheet S2 leaves the non-return valve 123, the pair of reversing rollers 124 is put into a temporarily-stopped state again. The target position mentioned above is set such that, at this time, the sheet S1 protrudes by a predetermined amount k with respect to the sheet S2 in a direction of conveyance from the pair of internal ejection rollers 126 toward the alignment unit 156. In other words, among the sheets having been put one on top of another at the buffer unit 120, the sheet S1, which is to be the lower one in the stack when located at the alignment unit 156, protrudes downstream in the direction of conveyance toward the alignment unit 156 by the predetermined amount k, as compared with the sheet S2, which is to be the upper one in the stack when located at the alignment unit 156. As illustrated in FIG. 5G, the pair of reversing rollers 124 changes its direction of rotation and then conveys the sheet S1 and the sheet S2 toward the pair of internal ejection rollers 126. The sheet S1 and the sheet S2 are conveyed by the pair of internal ejection rollers 126 toward the alignment unit 156. After the sheet S1 and the sheet S2 are nipped by the pair of internal ejection rollers 126, the upper reversing roller 124a moves in the E1 direction. This puts the pair of reversing rollers 124 into a separated state, in which the sheet S3, the succeeding one, is receivable. As illustrated in FIG. 5H, after the trailing edge of the sheet S2 leaves the pair of reversing rollers 124, the upper reversing roller 124a moves in the E2 direction. This puts the pair of reversing rollers 124 into a contact state for nipping and conveying the sheet S3.

By repeating the buffer operation described above, the buffer unit 120 is capable of sending a predetermined number of sheets each time in a state of being put one on top of another to the alignment unit 156. Though two-ply buffer operation of putting one sheet on top of another sheet has been taken as an example above, it is possible to further put the sheet S3 on top of the sheets S1 and S2 by temporarily stopping the conveyance of the sheets S1 and S2 from the state illustrated in FIG. 5G and conveying them in the reverse direction. That is, by repeating the operation from FIGS. 5D to 5G, the buffer unit 120 is capable of creating a sheet stack made up of three or more sheets (for example, five sheets) put one on top of another. The target position of putting sheets one on top of another is determined on the basis of the timing of detecting the trailing edge of the sheet by the gateway sensor 127. For this reason, even when the length of the sheet in the direction of conveyance changes, the buffer operation according to the present embodiment makes it possible to put the sheets one on top of another in a state of being shifted by the predetermined amount k each. The stack of the sheets having been put one on top of another at the buffer unit 120 is, as illustrated in FIG. 1, conveyed from the pair of internal ejection rollers 126 along an incoming conveyance path 165 by way of a pair of intermediate conveyance rollers 128 to a pair of kicking rollers 129. Then, the stack of the sheets is conveyed by the pair of kicking rollers 129 to the alignment unit 156 (an intermediate stacking portion, a processing stage) made up of an upper intermediate guide 151, a lower intermediate guide 152, and the like. For the purpose of avoiding interference between the trailing edge of already-stacked sheets on the alignment unit 156 and the leading edge of a succeeding sheet coming in to the alignment unit 156, a stack holder flag 150 configured to suppress a rise curl at the trailing edge of the already-stacked sheets is disposed downstream of the pair of kicking rollers 129.

Configuration of Alignment Unit

Figure 6:
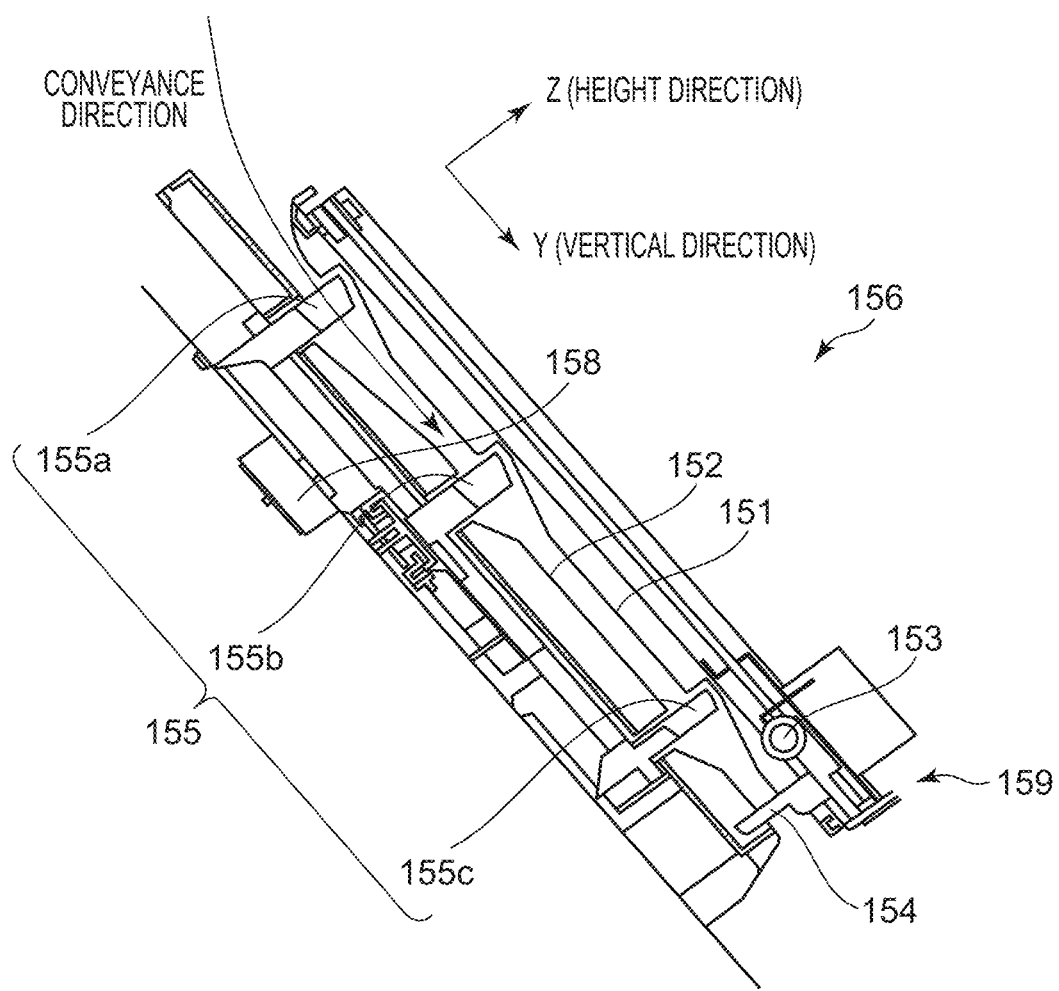
FIG. 6 is a diagram illustrating an alignment unit of the booklet creating apparatus according to one or more aspects of the present disclosure.
Figure 7:
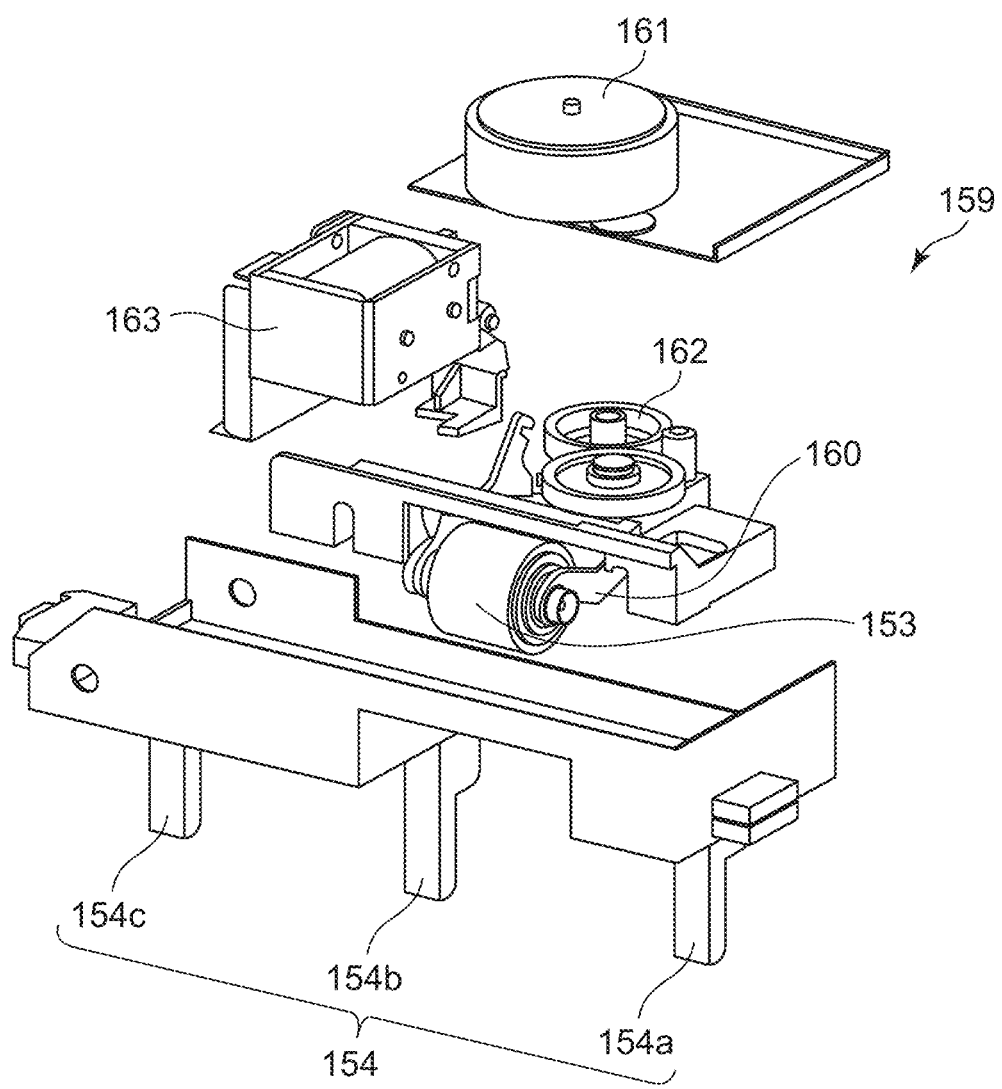
FIG. 7 is a diagram illustrating a movable unit of the alignment unit according to one or more aspects of the present disclosure.

Next, with reference to FIGS. 6 and 7, a configuration of the alignment unit 156 will now be described. FIG. 6 is a cross-sectional view of the alignment unit 156. FIG. 7 is an exploded view of elements that constitute a movable unit 159. In the description below and in each of the drawings, a direction in which a pressing member of the heating-and-pressing unit 167 moves with respect to a receiving member for the purpose of applying pressure to a stack of sheets will be referred to as "Z direction". The Z direction is a height direction (thickness direction) of a stack of sheets on the alignment unit 156. Directions that are orthogonal to each other in a virtual plane orthogonal to the Z direction are defined as an X direction and a Y direction. Where necessary, directions indicated by arrows X, Y, and Z in each of the drawings will be referred to as "+X side", "+Y side", and "+Z side" respectively, and the opposite sides will be referred to as "−X side", "−Y side", and "−Z side" respectively. In the present embodiment, the Y direction is substantially parallel to a conveyance direction in which sheets are conveyed to the alignment unit 156 by the pair of kicking rollers 129. In the present embodiment, the X direction is a sheet width direction orthogonal to the conveyance direction. In the description below, the Y direction may be referred to as "vertical direction", and the X direction may be referred to as "width direction" or "horizontal direction".

The alignment unit 156 includes a lower intermediate guide 152 functioning as an example of a stacking portion configured to support a stack of sheets, an upper intermediate guide 151 facing the lower intermediate guide 152, and a movable unit 159 including a vertical alignment plate 154 and a vertical alignment roller 153. As illustrated in FIG. 7, the vertical alignment plate 154 includes a plurality of sheet contact portions 154a, 154b, and 154c arranged next to each other in the sheet width direction. The sheet contact portions 154a, 154b, and 154c define a reference position for sheet alignment in the sheet conveyance direction (Y direction). The vertical alignment roller 153 is held rotatably by a roller holder 160. The roller holder 160 is pivotable by receiving a driving force of a solenoid 163. Due to the pivotal motion of the roller holder 160, the vertical alignment roller 153 is able to move between a position of being in contact with the sheet S on the lower intermediate guide 152 and thus conveying the sheet S and a position of being retracted up away from the sheet S. A drive motor 161 is mounted on the movable unit 159. The vertical alignment roller 153 rotates when a driving force of the drive motor 161 is transmitted thereto via a gear train 162. The movable unit 159, as a single integrated unit, is capable of moving in the sheet conveyance direction (Y direction) with respect to the lower intermediate guide 152.

Figure 8A:
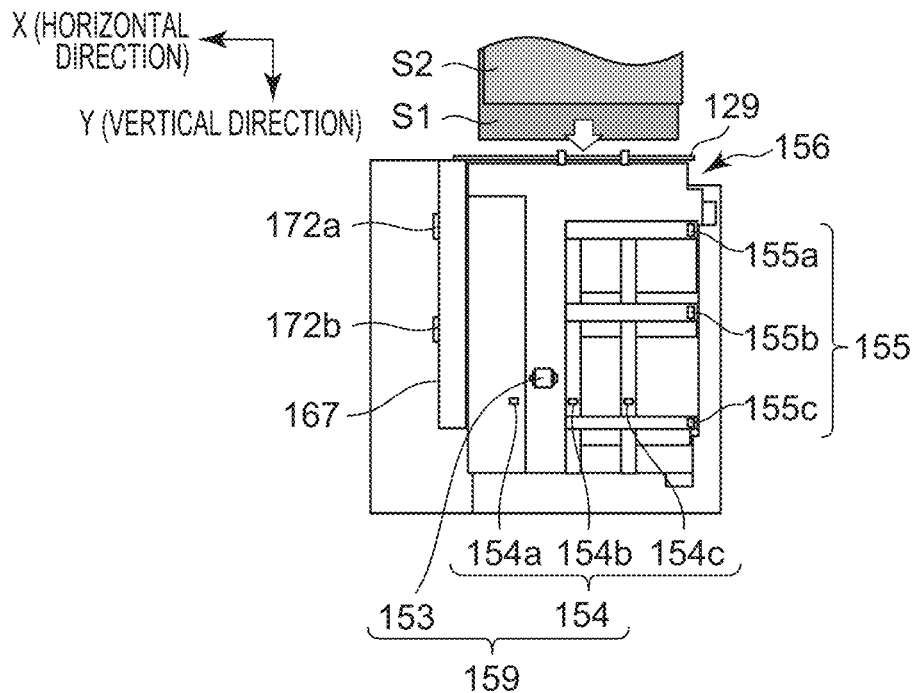
FIGS. 8A to 8F are a set of diagrams illustrating operation of the alignment unit according to one or more aspects of the present disclosure.

As illustrated in FIG. 6, the alignment unit 156 includes a width alignment member 155, a drive motor 158, and width alignment plates 172a and 172b (FIG. 8A). By receiving the driving force of the drive motor 158, the width alignment member 155 is movable in the sheet width direction (X direction). The width alignment member 155 includes a plurality of sheet pushing portions 155a, 155b, and 155c arranged next to each other in the sheet conveyance direction. As illustrated in FIG. 8A, the width alignment plates 172a and 172b are configured as a plurality of plate-like members (sheet contact portions) arranged next to each other in the sheet conveyance direction. The width alignment plates 172a and 172b define a reference position for sheet alignment in the sheet width direction (X direction).

Operation of Alignment Unit

With reference to FIGS. 8A to 8F, the operation of the alignment unit 156 will now be described. Each of FIGS. 8A to 8F is a schematic view of the alignment unit 156 as viewed from above in the Z direction. The illustration of the upper intermediate guide 151 and driving members/components, etc. of the heating-and-pressing unit 167 is omitted. When alignment of a stack of sheets on the alignment unit 156 is to be performed, the movable unit 159 is positioned to a predetermined standby position in advance in the sheet conveyance direction (Y direction) in accordance with the sheet size. The standby position is a position where the distance from the nip position of the pair of kicking rollers 129 to the sheet contact portions 154a to 154c of the vertical alignment plate 154 in the Y direction is slightly greater than the sheet length. The operation of the alignment unit 156 will be described below based on a case where an incoming sheet stack is made up of five sheets S1 to S5 having been put one on top of another at the buffer unit 120. The number of the sheets put one on top of another at the buffer unit 120 is not limited to five but may be changed to any number.

Figure 8B:
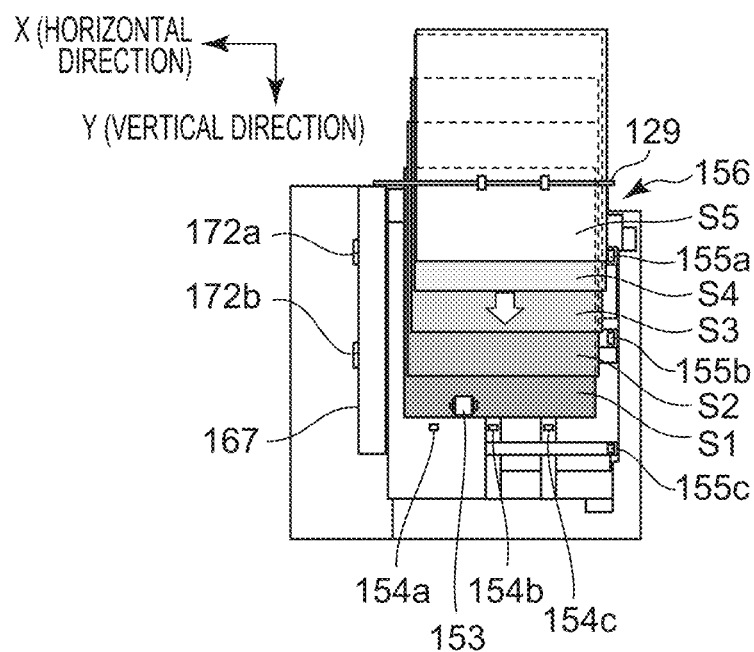
Figure 8C:
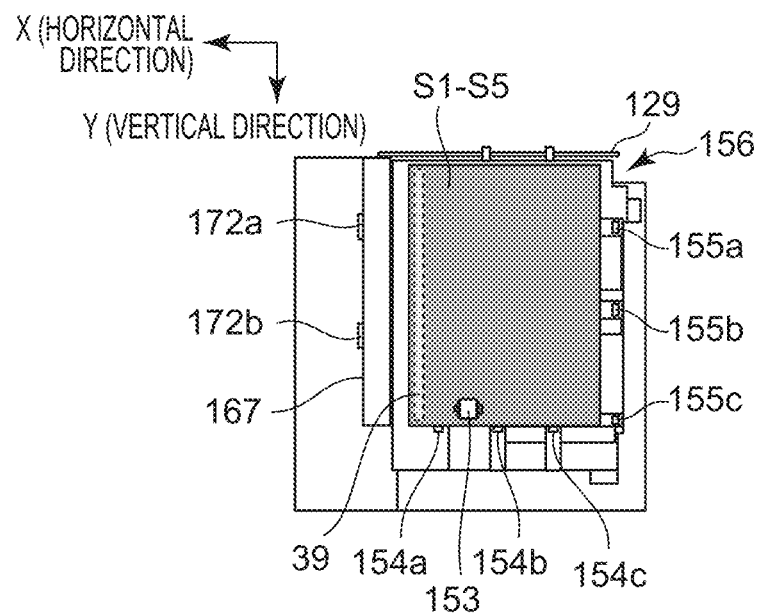
Figure 8D:
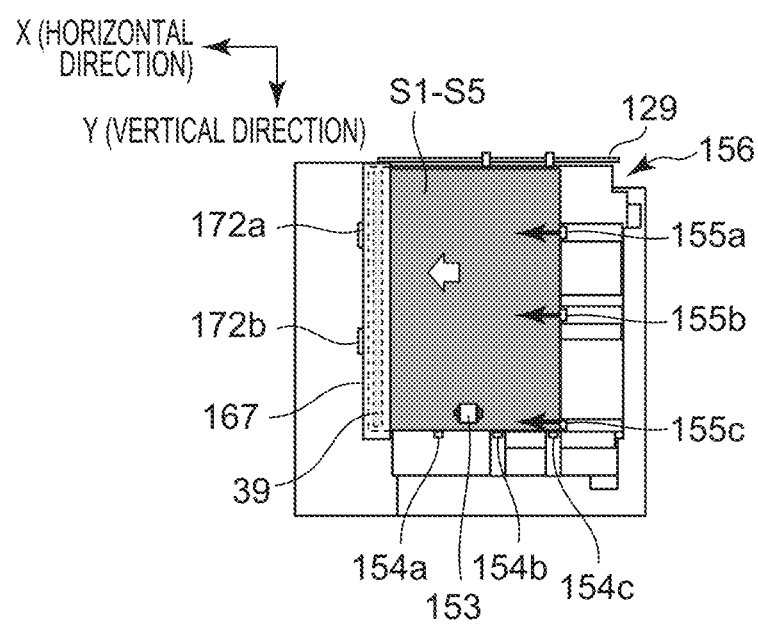
Figure 8E:
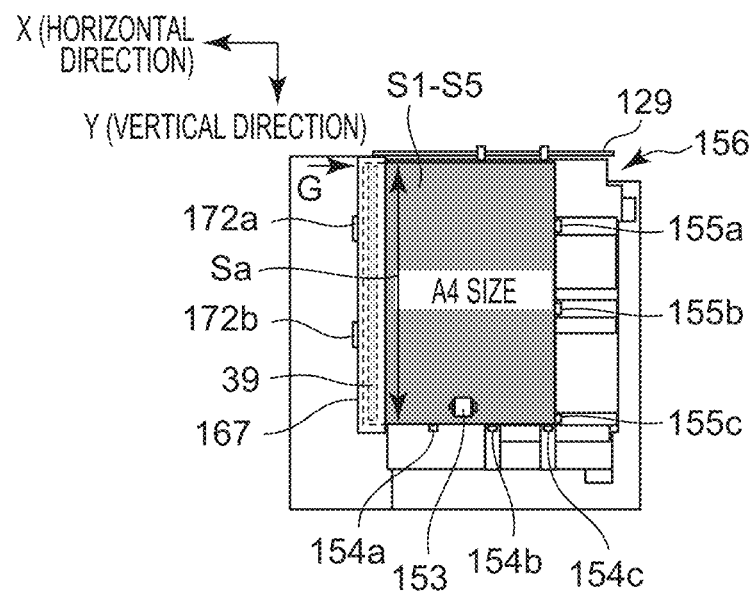
Figure 8F:
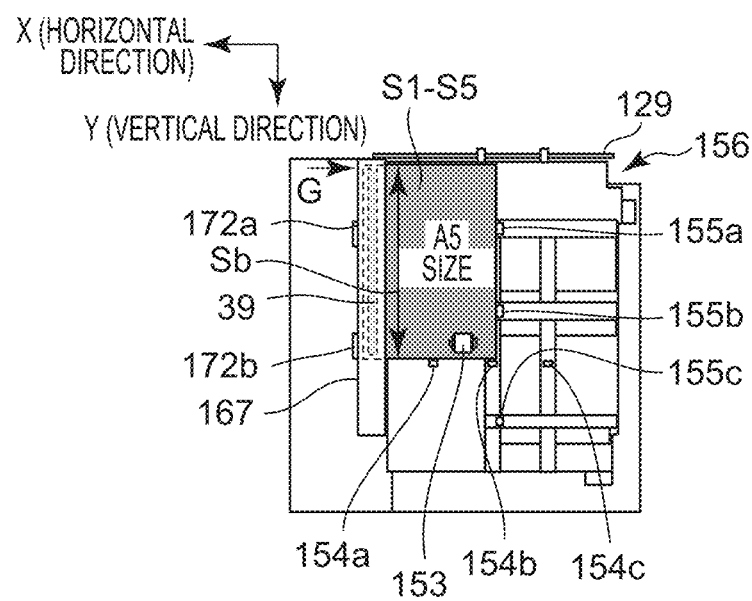

FIG. 8A illustrates a state in which the sheet S1, which is the first one, and the sheet S2, which is the second one, are being conveyed toward the alignment unit 156. The movable unit 159 (the vertical alignment plate 154 and the vertical alignment roller 153) have already moved to the standby position in accordance with the sheet size. The width alignment member 155 is waiting at a position located slightly outward of and away from a sheet-stack-side-edge position so as not to be obstructive to the conveyance of the sheet stack. FIG. 8B illustrates a state in which the trailing edge of the sheet S1, the first one, has left the nip of the pair of kicking rollers 129, and the leading edge of the sheet S1 has arrived at the vertical alignment roller 153. The vertical alignment roller 153 has been lowered to a contact position in advance due to electric energization to the solenoid 163 and is being rotated by the drive motor 161. The sheet S1 is transported toward the +Y side by the vertical alignment roller 153 and comes into contact with the vertical alignment plate 154, thereby being aligned in the sheet conveyance direction. After that, each time the succeeding sheet S2 to S5 leaves the pair of kicking rollers 129, the sheet is transported toward the +Y side by the vertical alignment roller 153 and is brought into contact with the vertical alignment plate 154, thereby being aligned in the sheet conveyance direction. FIG. 8C illustrates a state in which each of the five sheets S1 to S5 has come into contact with the vertical alignment plate 154, and the alignment of them in the sheet conveyance direction has completed. In this state, by supplying the driving force of the drive motor 158 (FIG. 6), the width alignment member 155 is moved in the sheet width direction (X direction). Sheet pushing portions 155a, 155b, and 155c of the width alignment member 155 push one side edge of the sheets S1 to S5, and, due to this pushing, the sheets S1 to S5 move toward the width alignment plates 172a and 172b. FIG. 8D illustrates a state in which the other side edge of each of the sheets S1 to S5 has come into contact with the width alignment plates 172a and 172b. The sheets S1 to S5 become aligned in the sheet width direction due to this side-edge contact. After this alignment, thermal compression bonding is performed by the heating-and-pressing unit 167 to be described later in a state in which the plural sheets, with adhesive layer formed thereon, are stacked. In the present embodiment, thermal compression bonding is performed on the five sheets S1 to S5. In a case where a booklet made up of six or more sheets is to be created, the alignment unit 156 performs preparation to be ready for accepting the sixth sheet (and subsequent sheets), concurrently with the thermal compression bonding of the sheets S1 to S5. Specifically, the width alignment member 155 moves in the retracting direction (toward the −X side). FIG. 8E illustrates a sheet position after the XY alignment in a case where the size of the sheet S is an A4 size. FIG. 8F illustrates a sheet position after the XY alignment in a case where the size of the sheet S is an A5 size. In the present embodiment, the Y alignment is performed in such a manner that one side edge of the sheets S becomes aligned with a vertical alignment reference position G of the heating-and-pressing unit 167 (single side reference). The heating-and-pressing unit 167 is a device that performs longer-edge bookbinding bonding in the vertical direction on an edge portion of sheets. The greatest sheet width (Sa) that the heating-and-pressing unit 167 can support is 297 mm, which corresponds to the A4 size (vertical size 297 mm×horizontal size 210 mm). The least sheet width (Sb) that the heating-and-pressing unit 167 can support is 210 mm, which corresponds to the A5 size (vertical size 210 mm×horizontal size 149 mm). Booklet creation can be performed for any supported sheet size between A4 inclusive, which is the maximum size, and A5 inclusive, which is the minimum size. For example, the B5 size (vertical size 257 mm×horizontal size 182 mm) is also supported.

Heating-and-Pressing Unit

Figure 9:
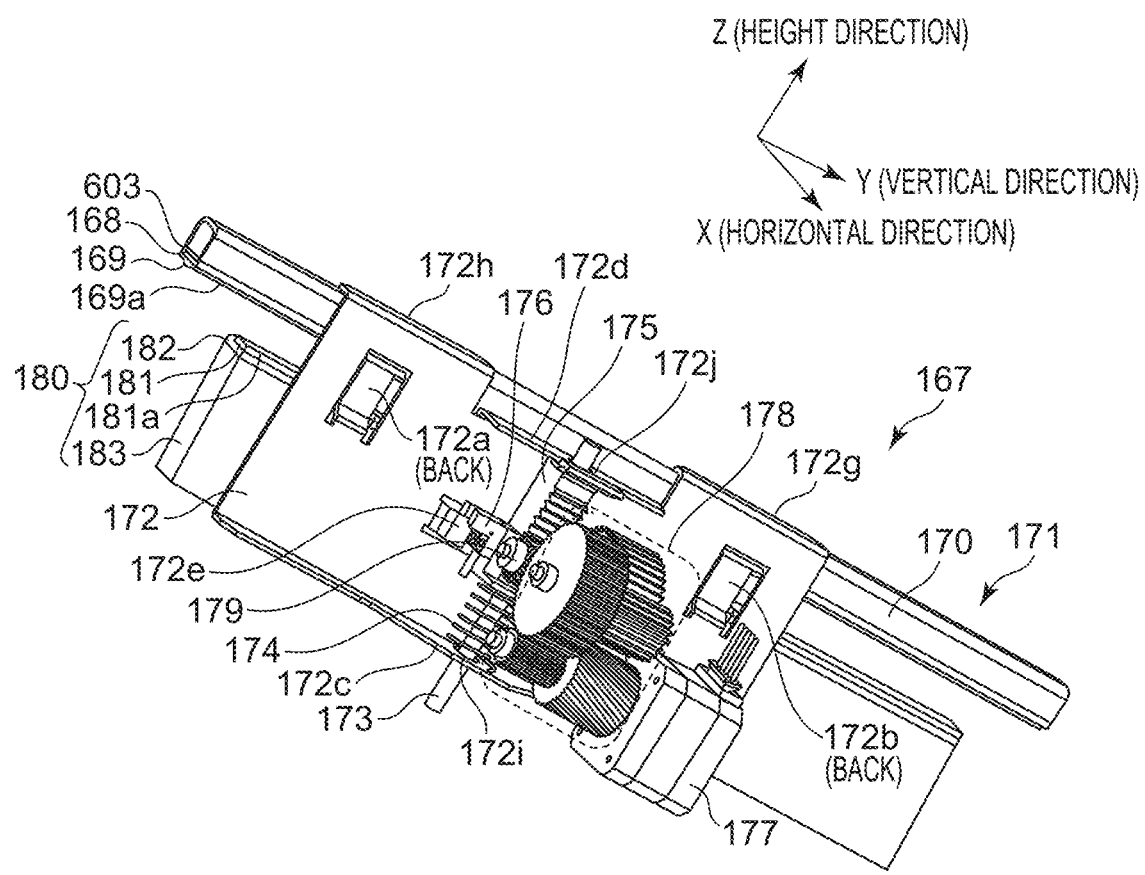
FIG. 9 is a diagram for explaining a heating-and-pressing unit according to one or more aspects of the present disclosure.

With reference to FIG. 9, a configuration of the heating-and-pressing unit 167 according to the present embodiment will now be described. FIG. 9 is a perspective view of the heating-and-pressing unit 167. The heating-and-pressing unit 167 is an example of a sheet adhesive bonding apparatus (an adhesive bonding unit, an adhesive bonder, a thermal compression bonder, a pasting processor) configured to glue the sheets together.

As illustrated in FIG. 9, the heating-and-pressing unit 167 includes a heating unit 171 including a pressing plate 169 and functioning as an example of a heat-and-pressure applier, a receiving member 180 facing the pressing plate 169 and configured to receive a pressing force of the heater portion, and a drive system including a motor 177. The receiving member 180 includes a receiving plate 181 made of an elastic material, a receiving plate supporting member 182 that is a heat-resistant resin member designed to support the receiving plate 181, and a receiving-side frame 183 having high rigidity and made of metal and designed to support the receiving plate supporting member 182. A silicone rubber sheet is used as the material of the receiving plate 181. The silicone rubber sheet has a thickness (in the Z direction) of 3 mm and has a rubber hardness of 700 (ISO 7619 standard). Though a heat-resistant silicone rubber having a moderate elasticity is used in the present embodiment, this does not imply any limitation. Any other material having a required heat resistance, a required elasticity, and a required pressing force receiving property may be used instead. The heating unit 171 includes the pressing plate 169, a ceramic heater (heating entity) 168, and a metal stay 170. The pressing plate 169 is an example of a pressing member configured to apply pressure to a stack of sheets that is the target of adhesive bonding. The pressing plate 169 has an elongated plate-like shape having a thickness in the Z direction and being long in the Y direction. An aluminum material (A6063 material) is used as the material of the pressing plate 169. Basically, the pressing plate 169 has a thickness of 0.8 mm. The length of the pressing plate 169 in the Y direction is 300 mm. The aluminum material (A6063) used as the material of the pressing plate 169 has a Young's modulus of 68 Gpa and a thermal conductivity $\lambda_p$ of 237 W/mK. Using a highly thermal conductive material such as the aluminum material (A6063) as the material of the pressing plate 169 and configuring its thickness to be thin makes it easier to transfer the heat of the ceramic heater 168, which is the source of heating, to the sheets S. Table 1 shows the mechanical strength of aluminum (A6063 material) (values quoted from a publication). The mechanical strength (tensile strength, resistance) of an A6063 material tends to decrease in a high-temperature region of 150° C. and higher.

TABLE 1

High-temperature characteristics of mechanical strength of aluminum (A6063 material)

| Temperature (° C.) | Tensile strength (N/mm$^2$) | Resistance (N/mm$^2$) |
|---|---|---|
| 25 | 185 | 145 |
| 100 | 165 | 140 |
| 150 | 140 | 125 |
| 205 | 60 | 45 |
| 260 | 31 | 24 |
| 315 | 22 | 17 |
| 370 | 16 | 14 |

(Source: Aluminum Handbook, 6th Edition)

The ceramic heater 168 is an example of a heating component configured to heat the pressing member. The ceramic heater 168 is a heater board that includes a ceramic substrate on which a pattern of a heat generation resistor is formed. The ceramic heater 168 is disposed in contact with the pressing plate 169. The ceramic heater 168 has a thickness of 1.0 mm, a width of 8.0 mm, a length of 350 mm, and a thermal conductivity $\lambda_h$ of 22 W/mK. The thermal conductivity $\lambda$ was measured using a thermal conductivity measuring apparatus (ai-Phase Mobile 2 of ai-Phase Co., Ltd.). The Young's modulus of the ceramic heater 168 is 370 Gpa. A heater support member 603 is a member for supporting the ceramic heater 168. The heater support member 603 is fixed to the pressing plate 169 and the metal stay 170, which is rigid. The material of the heater support member 603 is a heat-resistant resin. In the present embodiment, an LCP (Liquid Crystal Polymer) is used as the material of the heater support member 603.

The metal stay 170 is a member made of iron having a thickness of 1.8 mm and having a U-bent shape for further increasing its rigidity. A lift plate 172 is fixed to the metal stay 170 of the heating unit 171. The lift plate 172 has portions 172g and 172h for contact with the metal stay 170. The lift plate 172 moves integrally with the heating unit 171. In the present embodiment, the width alignment plates 172a and 172b mentioned earlier are formed integrally with the lift plate 172 by bending a part of a sheet-metal member of which the lift plate 172 is made. The lift plate 172 has a slight clearance (172i, 172j) with respect to a guide shaft 173, and is therefore capable of moving in the Y direction to some extent along the sheet surface when the pressing plate 169 is brought into contact with a stack of sheets as indicated by a dotted line M.

The heating-and-pressing unit 167 is capable of performing thermal compression bonding of a stack of sheets on the alignment unit 156 along one side extending in the Y direction by using the pressing plate 169 extending in the Y direction. The alignment unit 156 and the heating-and-pressing unit 167 according to the present embodiment are capable of performing so-called longer-edge bookbinding bonding, in which sheets having a size of A4 or the like are aligned in an orientation in which their longer edge is parallel to the sheet conveyance direction (longer-edge portrait-feed orientation) and then are bonded using thermal compression bonding at an adhesive bonding area (FIG. 2A) that is located along the longer edge. The drive system (pressing mechanism) of the heating-and-pressing unit 167 includes the motor 177 operating as a drive source, a gear train 178, a pinion gear 179, and a rack gear 175. The gear train 178, the pinion gear 179, and the rack gear 175 operate as an example of a drive transmission mechanism configured to transform the rotation of the motor 177 into a force in a direction in which the heating unit 171 moves (Z direction) and transmit the force to the heating unit 171.

The pinion gear 179 is connected indirectly to the motor 177, with the gear train 178 interposed therebetween. The pinion gear 179 is in mesh with the rack gear 175. The gear train 178, the pinion gear 179, and the rack gear 175 constitute a speed reduction mechanism for obtaining a pressing force required for thermal compression bonding of a stack of sheets. As the speed reduction mechanism, for example, a worm gear or a planetary gear mechanism may be used. Guided by a guide shaft 173 having a columnar shape and extending in the Z direction, the rack gear 175 reciprocates in the Z direction. The guide shaft 173 is fixed to a frame body of the heating-and-pressing unit 167. A compression spring 174 configured to generate a force for pressing the pressing plate 169 onto the sheets S is disposed between the rack gear 175 and the lower surface 172c of the lift plate 172. When the heating unit 171 is located away in the Z direction, the rack gear 175 is in abutment with the upper surface 172d of the lift plate 172 due to urging by the compression spring 174. A photo interrupter 176 is held integrally with the rack gear 175 and is configured to detect a change in relative position of the rack gear 175 and the lift plate 172. The movement of the heating unit 171 up and down is driven by the motor 177. Since the pinion gear 179 is in mesh with the rack gear 175, the rotation of the motor 177 is transmitted indirectly to the rack gear 175 via a non-illustrated motor gear and the gear train 178. When the heating-and-pressing unit 167 performs thermal compression bonding of a stack of sheets, the rack gear 175 moves in the pressing direction (toward the −Z side) due to the driving force transmitted from the motor 177. Accordingly, the lift plate 172 and the heating unit 171 move in the pressing direction (toward the −Z side), and the pressing plate 169 comes into contact with the stack of the sheets S. The heating unit 171 moves away from the stack of the sheets S after applying a pressing force thereto.

Figure 10A:
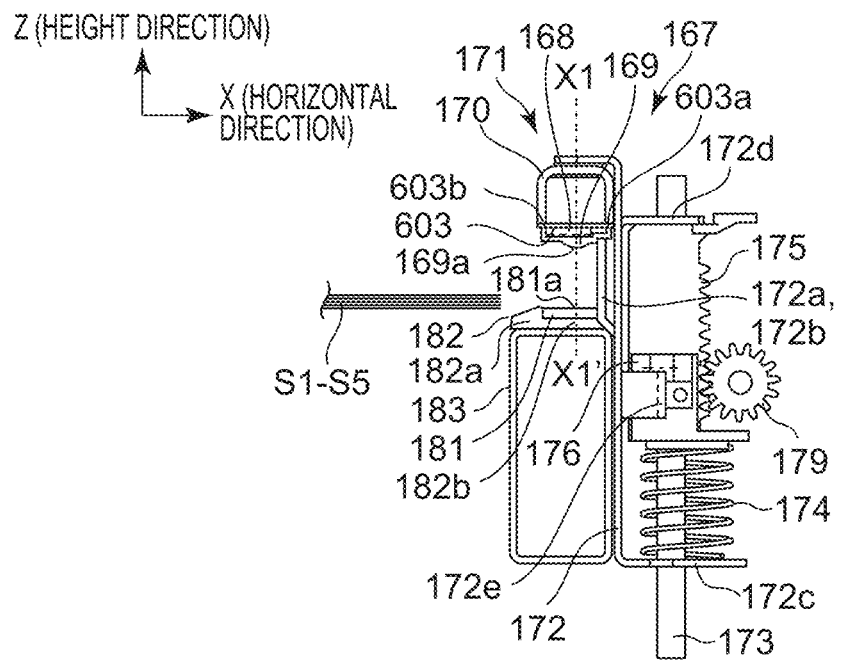

As illustrated in FIG. 10A, the pressing plate 169 has, basically, a thickness of 0.8 mm, has a cross-sectional shape of protruding in a pressing direction (toward the −Z side) at its center portion in the X direction, and extends in the Y direction. The apex of the protruding portion 169a of the pressing plate 169 in contact with the upper surface of the stack of the sheets S corresponds to the pressing center position (X1-X1' cross section) of the heating-and-pressing unit 167. For the purpose of making surface pressure at the time of booklet-binding pressing high by concentrating the force of the pressing by the heating-and-pressing unit 167, the protruding portion 169a has a curved surface shape with a diameter of 2.5 mm and protrudes in the −Z direction by 0.7 mm. Therefore, the pressing plate 169 presses the stack of the sheets S at a pressing width of 2.0 mm or so in the X direction. The pressing plate 169 is bonded to the heater support member 603 at bonding portions 603a and 603b throughout the entire area in the Y direction by using a heat-resistant silicone adhesive. The ceramic heater 168 is in a state of being urged toward the pressing plate 169 due to contact pressure of a spring of a thermistor TH (not illustrated) provided on the heater support member 603. The receiving plate supporting member 182 includes a sheet guide portion 182a for sheet conveyance to the heating-and-pressing unit 167 and a receiving plate supporting portion 182b that supports the receiving plate 181 and receives the pressing force of the heater portion. The receiving plate supporting portion 182b has a function of adjusting a pressing force distribution in the longer-side direction at the pressing center position (X1-X1' cross section) of the heating unit 171. A detailed explanation of this will be given later. The receiving-side frame 183 is flat at the surface of contact with the receiving plate supporting member 182. In the present embodiment, a heat-resistant PPS material (polyphenylene sulfide material) is used as the material of the receiving plate supporting member 182.

The heating unit 171 includes a thermistor TH that is an example of a non-illustrated temperature detector configured to detect a temperature of the ceramic heater 168. A resistive element that has NTC (Negative Temperature Coefficient) characteristics is used as the thermistor TH according to the present embodiment. However, this does not imply any limitation. A resistive element that has PTC (Positive Temperature Coefficient) characteristics, or various kinds of thermocouple or radiation thermometer may be used. The thermistor TH is disposed at a position that is away from the vertical alignment reference position G as an example of a sheet reference position by 149 mm to correspond to the center of the longer edge of the A4 size in the heating-and-pressing unit 167. The control unit of the booklet creating apparatus 106 is capable of performing temperature control by using a non-illustrated electric power applier such that the detection temperature of the thermistor TH becomes a set temperature that is a predetermined temperature (220° C.).

On condition that the close-contact property of the pressing plate 169 and the ceramic heater 168 is sufficient, it is possible to adjust the surface temperature of the pressing plate 169 into 190° C. by setting the temperature of the ceramic heater 168 at 220° C. This makes it possible to set the toner temperature for bonding the maximum five sheets together at one time to be the reference temperature of 800 or higher.

Operation of Heating-and-Pressing Unit

Figure 10B:
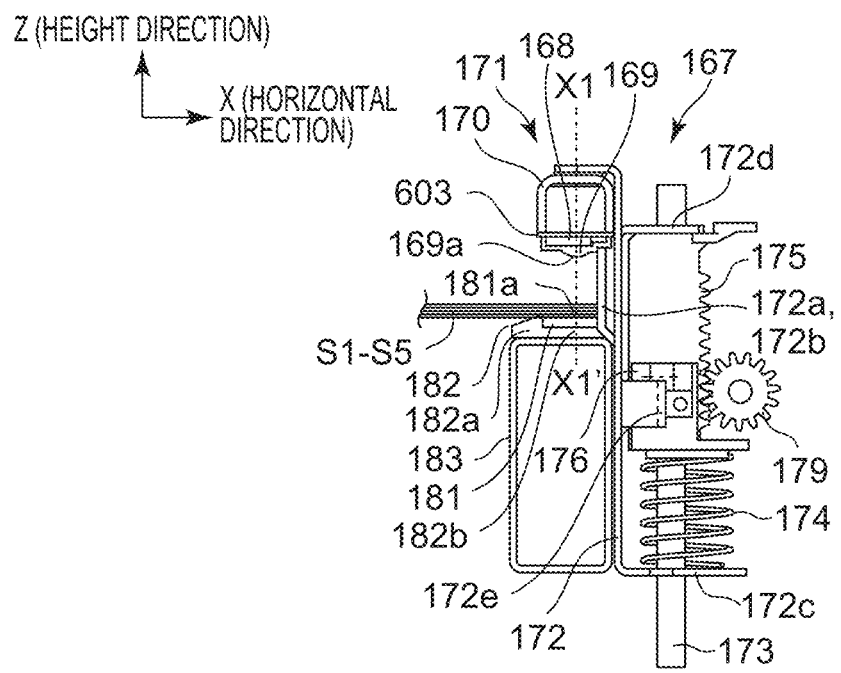
Figure 10C:
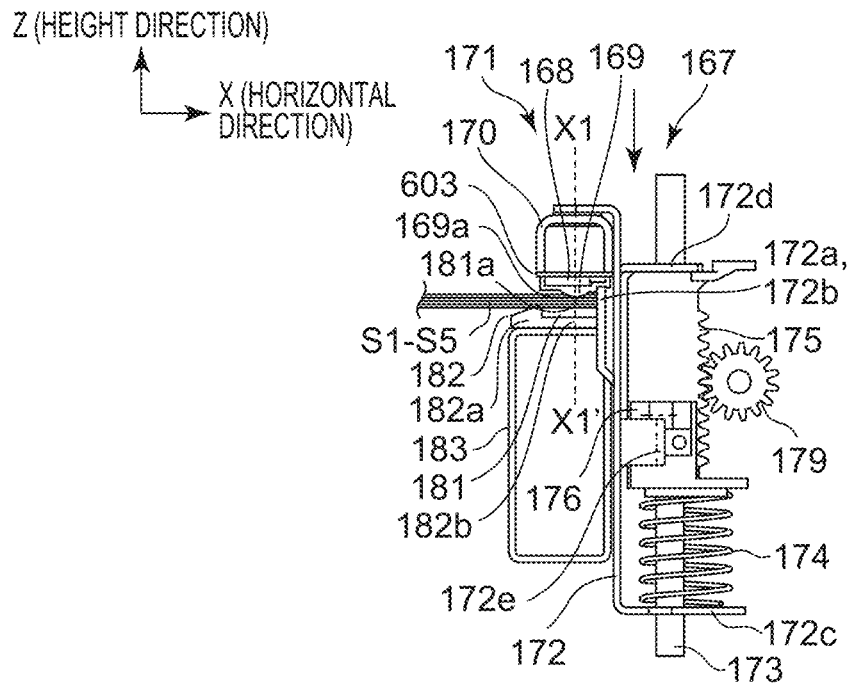
Figure 10D:
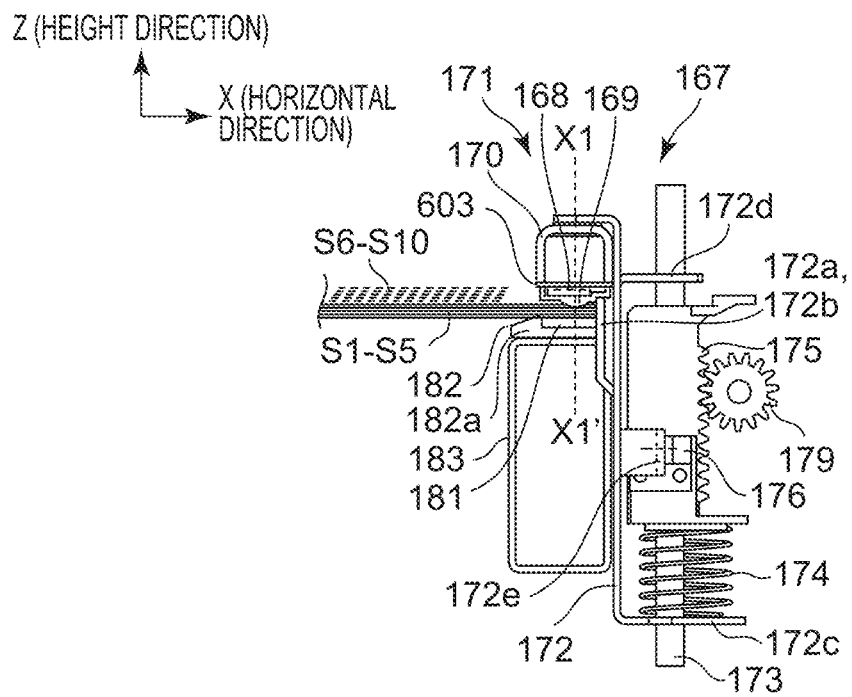

With reference to FIGS. 10A to 10F, the thermal compression bonding operation of the heating-and-pressing unit 167 will now be described. Each of FIGS. 10A to 10F is a view of the heating-and-pressing unit 167 in the sheet conveyance direction (Y direction). FIG. 10A illustrates the same state as that of FIG. 8C, that is, a state in which the alignment of the sheets S1 to S5 in the sheet conveyance direction (Y direction) has completed. In this state, the heating unit 171 is located away from the sheet stack in the Z direction. FIG. 10B illustrates the same state as that of FIG. 8D, that is, a state in which the alignment of the sheets S1 to S5 in the width direction has completed. By being brought into contact with the width alignment plates 172a and 172b, the sheets S1 to S5 are aligned in the sheet width direction (X direction). FIG. 10C illustrates a state in which, due to forward rotation of the motor 177, the heating unit 171 has moved in the pressing direction (toward the −Z side) and thus in which the protruding portion 169a of the pressing plate 169 has come into contact with the sheet S5, which is the topmost one. FIG. 10D illustrates a state in which, due to continued driving of the motor 177, the sheets S1 to S5 are sandwiched between the pressing plate 169 and the receiving plate 181 and thus in which thermal compression bonding of the sheets S1 to S5 is being performed now. The compression spring 174 is compressed by being pushed by the lower surface of the rack gear 175, and the resilience of the compression spring 174 is therefore high in this state. Due to the resilient force of the compression spring 174 acting via the lift plate 172 and the heating unit 171, the sheets S1 to S5 are pressed by the pressing plate 169 at a predetermined magnitude of a pressing force. In the present embodiment, the duration of the pressing is 3.0 sec. The motor 177 is controlled to produce a predetermined magnitude of a pressing force by stopping at a predetermined amount of rotation after the photo interrupter 176 is optically blocked by the rib 172e of the lift plate 172.

FIG. 10D further illustrates that the next sheets S6 to S10 have come to the alignment unit 156, concurrently with the thermal compression bonding of the sheets S1 to S5. FIG. 10E illustrates a state in which, after the completion of the thermal compression bonding of the sheets S1 to S5, due to reverse rotation of the motor 177, the heating unit 171 has moved (retracted) toward the opposite side in the pressing direction (toward the +Z side) and thus in which the pressing plate 169 has become separated away from the sheet S5. FIG. 10E further illustrates that the alignment of the next sheets S6 to S10 has been performed and, after the retracting movement of the heating unit 171, the sheets S are in contact with the width alignment plates 172a and 172b. FIG. 10F illustrates a state in which, due to forward rotation of the motor 177, the heating unit 171 has moved in the pressing direction (toward the −Z side) again, in which the sheets S1 to S10 are sandwiched between the pressing plate 169 and the receiving member 180, and thus in which thermal compression bonding of the sheets S6 to S10 is being performed now. The motor 177 is controlled to produce a predetermined magnitude of a pressing force by stopping at a predetermined amount of rotation after the photo interrupter 176 is optically blocked by the rib 172e of the lift plate 172. By this means, it is possible to make the working length of the compression spring 174 at the time of performing the thermal compression bonding of the sheets S6 to S10 in FIG. 10F the same as the working length of the compression spring 174 at the time of performing the thermal compression bonding of the sheets S1 to S5 in FIG. 10D. That is, even when there is a change in the thickness of the sheets S aligned with the heating-and-pressing unit 167, it is possible to perform the thermal compression bonding of the sheet stack with a constant magnitude of a pressing force applied to the sheet stack. Since an adhesive-use toner image is formed on the upper surface of the sheet S5 and/or the lower surface of the sheet S6, the sheet stack made up of the sheets S1 to S5, which have already been bonded together, and the sheet stack made up of the sheets S6 to S10 are bonded to each other by using thermal compression bonding.

As described above, the heating-and-pressing unit 167 is capable of creating a booklet made up of sheets the number of which is greater than a predetermined number by performing the thermal compression bonding operation once each time a sheet stack made up of the predetermined number of sheets is aligned by the alignment unit 156. Though an example of creating a booklet made up of ten sheets, the sheets S1 to S10, has been described above, it is possible to create a booklet made up of several tens of sheets or more. Though a sequence of performing thermal compression bonding operation at a cycle of the predetermined number of sheets has been described, the thermal compression bonding operation may be performed according to any number-of-sheet routine such as, for example, initially performing thermal compression bonding of two sheets and thereafter performing thermal compression bonding of each one sheet. It is possible to set the magnitude of the pressing force to a desired magnitude by adjusting the amount of rotation till stopping of the motor 177 after the optical blocking of the photo interrupter 176 by the rib 172e. In the present embodiment, the maximum value of a total pressing force applied to the sheet stack is 30 kgf. The pressing force applied to the sheet stack can be measured by using a roller pressure distribution measuring system (PINCH) manufactured by Nitta Corporation and sandwiching a pressure-sensitive sensor sheet including a piezoelectric element at the sheet pressing portion.

Next, to confirm the operational effect of the present embodiment, comparative verification of the present embodiment, a first comparative example, and a second comparative example was performed. The comparative verification was performed regarding booklet bonding strength before and after a durability test involved in booklet creation. The present embodiment achieved better results of booklet bonding strength than those of the first comparative example and the second comparative example while suppressing the plastic deformation of the heating plate after the durability test by properly adjusting the temperature control of the heating-and-pressing unit 167, the pressing force control thereof, and the number-of-sheets control thereof.

Figure 11A:
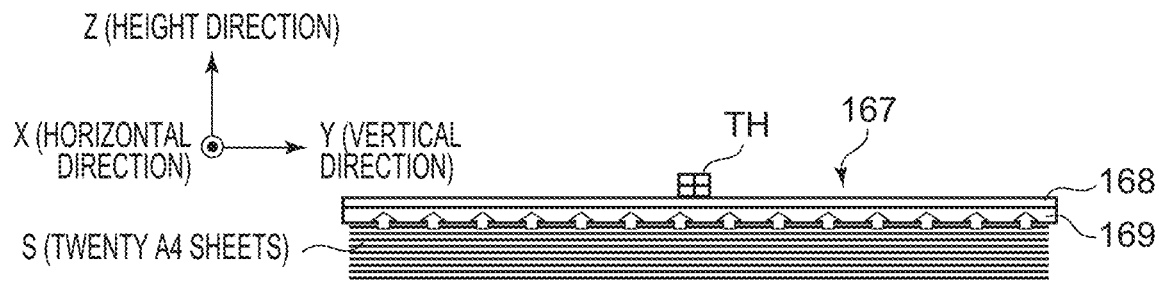
FIGS. 11A to 11C are a set of diagrams illustrating the close-contact property of a ceramic heater and a heating plate at the time of thermal compression bonding processing.

FIG. 11A is a schematic cross-sectional view, taken along a section line X1-X1' of FIG. 10F, of thermal compression bonding processing of a stack of twenty A4-size sheet S performed by using the heating-and-pressing unit 167 according to the present embodiment. For simplified illustration, the ceramic heater 168, the pressing plate 169, the thermistor TH, and the sheets S (twenty A4-size sheets) only are illustrated. As illustrated in FIG. 11A, the heating-and-pressing unit 167 and the heating unit 171 according to the present embodiment are sized for A4, the maximum sheet size, and can therefore press the sheets S uniformly.

Arrows F1, F2 in FIG. 11A indicate pressure that the pressing plate 169 receives when the heating unit 171 presses the sheets S. Stress that the pressing plate 169 receives is uniform in the longer-side direction of the pressing plate 169. Therefore, no deformation of the pressing plate 169 occurs, and good close-contact property of the ceramic heater 168 and the pressing plate 169 is maintained.

Figure 11B:
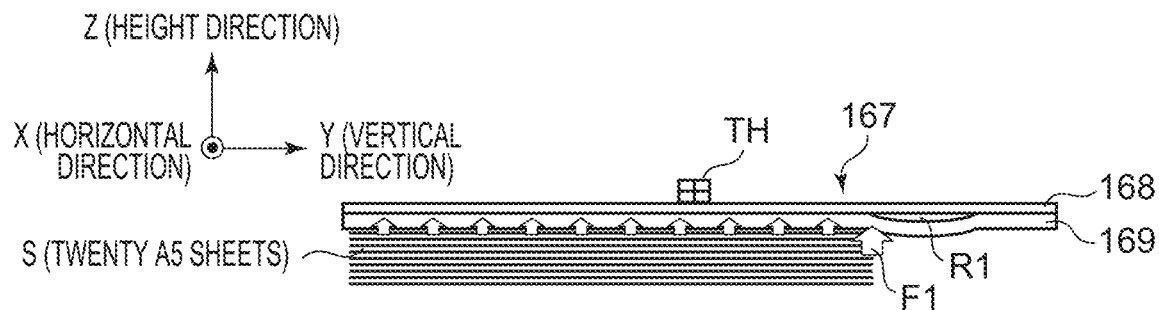

On the other hand, FIG. 11B is a schematic cross-sectional view, taken along the section line X1-X1', of thermal compression bonding processing of a stack of twenty A5-size sheet S performed by using the thermal compression bonding unit according to the present embodiment.

As can be seen, intense stress concentration F1 occurs at the press position at the edge of the A5-size sheet stack of the pressing plate 169. The stress concentration occurs at F1 in this example, and the measured value of F1 was approximately 2.0 Mpa. The plastic deformation of the pressing plate 169 occurs due to the influence of the local occurrence of intense stress, and this produces, outside the sheet stack, a region R1 where its property of close contact with the ceramic heater 168 decreases slightly. The average value of the stress F2 that the pressing plate 169 incurs in the present embodiment is approximately 0.5 Mpa.

Figure 11C:
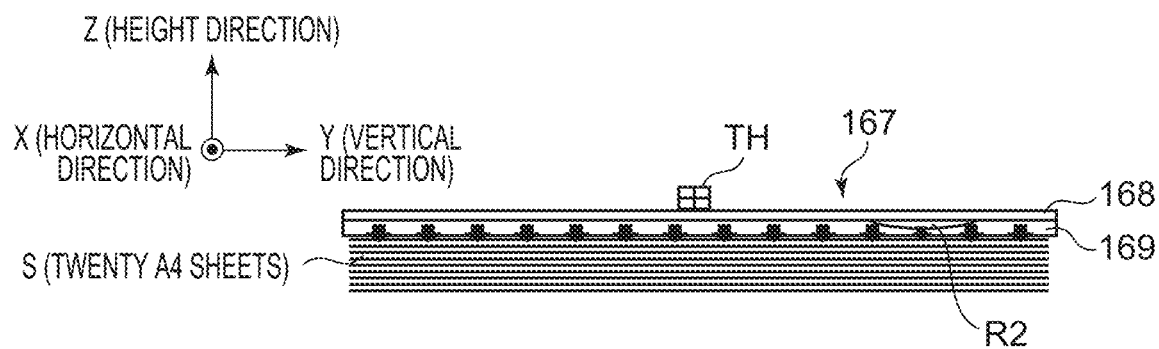

The applicant found that the plastic deformation at the R1 position could sometimes be significant after the durability test of repeating booklet creation (A5 size) by the heating-and-pressing unit 167. Specifically, the plastic deformation of the pressing plate 169 at the R1 position is significant in a case where the setting temperature of the thermistor TH at the time of A4-size sheet booklet creation and the setting temperature of the thermistor TH at the time of A5-size sheet booklet creation are the same as each other. When the plastic deformation of the pressing plate 169 is significant, the heat transfer of the ceramic heater 168 to the pressing plate 169 is impaired due to this influence. The applicant's finding is that, as a result of such poor heat transfer, as illustrated in FIG. 11C, at the time of A4-size booklet creation, the temperature of the pressing plate 169 at the region of plastic deformation (R2) is low, making the applying of heat from the pressing plate 169 to the sheets insufficient, thus resulting in a decrease in the strength of adhesive bonding of the booklet. In the present embodiment, as will be described in detail about comparative experiments later, the setting temperature of the thermistor TH at the time of A5-size sheet booklet creation is made lower than the setting temperature of the thermistor TH at the time of A4-size sheet booklet creation, thereby suppressing the influence of the after-durability plastic deformation of the pressing plate 169.

To verify the operational effect of the present embodiment, the results of comparative verification of the present embodiment, first to third comparative examples, and a first variation example are shown in Table 2. In the present embodiment, the first to third comparative examples, and the first variation example, (a) sheet size, (b) total pressing force, (c) setting temperature of the thermistor TH, and (d)

pressing time were set as setting conditions, and booklet creation was performed under the conditions. The following booklet bonding strengths were measured: (e) booklet bonding strength at the initial phase (before the durability test) of the heating-and-pressing unit, and (f) booklet bonding strength after the durability test of the heating-and-pressing unit.

TABLE 2

Results of comparative verification of first embodiment, first to third comparative examples, and first variation example

| | (a) Sheet size | (b) Total pressing force [kgf] | (c) Setting temperature [° C.] | (d) Pressing time [sec.] | (e) Booklet bonding strength (Initial) A4-E12 A5-F6 [N/cm] | (f) Booklet bonding strength (After durability test) A4-E12 A5-F6 [N/cm] |
|---|---|---|---|---|---|---|
| Present embodiment | A4 | 30 | 220 | 3.0 | 1.2 (OK) | 1.2 (OK) |
| | A5 | 30 | 150 | 5.0 | 1.1 (OK) | 1.2 (OK) |
| First comparative example | A4 | 30 | 220 | 3.0 | 1.2 (OK) | 0.6 (Not OK) |
| | A5 | 30 | 220 | 3.0 | 1.2 (OK) | 1.2 (OK) |
| Second comparative example | A4 | 30 | 150 | 3.0 | 0.7 (Not OK) | |
| | A5 | 30 | 150 | 3.0 | 0.7 (Not OK) | |
| Third comparative example | A4 | 20 | 220 | 3.0 | 0.7 (Not OK) | |
| | A5 | 20 | 220 | 3.0 | 0.7 (Not OK) | |
| First variation example | A4 | 30 | 220 | 3.0 | 1.2 (OK) | 1.2 (OK) |
| | A5 | 20 | 220 | 7.0 | 1.1 (OK) | 1.2 (OK) |

In the comparative verification, for the purpose of confirming effects concerning the plastic deformation of the pressing plate 169, a durability test of creating ten thousand booklets, each made up of twenty A5-size sheets, was conducted, and booklet bonding strength before the durability test and booklet bonding strength after the durability test were evaluated. The reason why the number of sheets making up each booklet was set to be twenty in conducting the durability test of the A5-size sheet booklet creation is that the concentration of stress onto the heating plate by the A5-size sheet edge portion tends to be significant when the sheet stack has a certain degree of thickness. A method for testing booklet quality in terms of booklet bonding strength in the comparative verification conducted this time will now be described. A first step of the method is booklet creation using the image forming system 100 and the heating-and-pressing unit 167. A stack made up of twenty sheets was created for each of the test conditions. The processing for adhesive bonding of the sheet stack by the heating-and-pressing unit 167 was performed at a cycle of five sheets together. In the booklet bonding strength test conducted this time, an A4-size sheet GF-C081 manufactured by CANON KABUSHIKI KAISHA was used as each sheet S. In the A5-size sheet experiment, each A4-size sheet GF-C081 was cut into half for use in performing the comparison, thereby eliminating influences other than the sheet size.

Figure 12A:
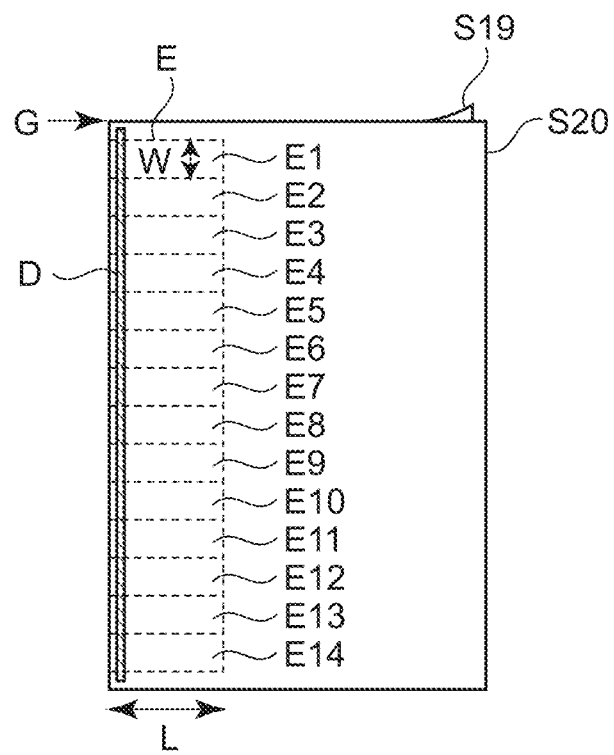
FIGS. 12A to 12C are a set of schematic views illustrating a method for testing booklet bonding strength.
Figure 12B:
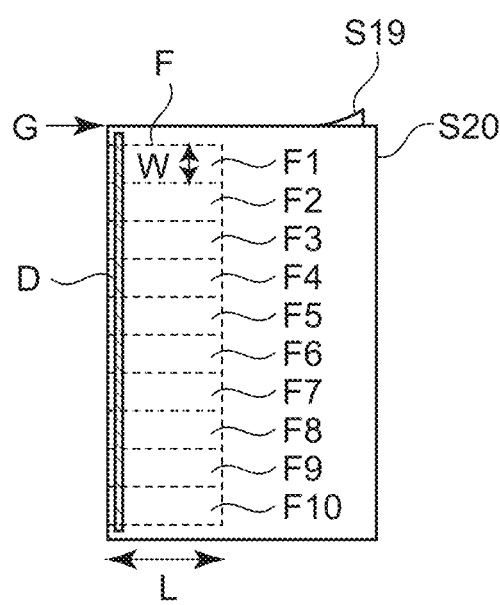

Next, a method for producing, from the created booklet, test strips to be used for conducting the quality test in terms of booklet bonding strength will now be described. Test strips E or test strips F are produced from each of two booklets as illustrated in FIGS. 12A and 12B where the former corresponds to the A4-size paper and the latter corresponds to the A5-size paper. Booklets each made up of two sheets S19 and S20 only were obtained by tearing off sheets S1 to S18 corresponding to the first through eighteenth pages from respective before-tearing-off booklets made up of twenty A4-size sheets and made up of twenty A5-size sheets. After that, for the A4-size paper, as illustrated in FIG. 12A, the A4-size test strips E each including a bonded portion D were produced by cutting them out of the booklet in such a manner that each of them has a width (W) of 20 mm and a length (L) of 50 mm. At this time, the test strips E were produced as E1 to E14 denoted in this order from the vertical alignment reference position G. Similarly, for the A5-size paper, as illustrated in FIG. 12B, the A5-size test strips F each including a bonded portion D were produced by cutting them out of the booklet in such a manner that each of them has a width (W) of 20 mm and a length (L) of 50 mm. At this time, the test strips F were produced as F1 to F10 denoted in this order from the vertical alignment reference position G.

Figure 12C:
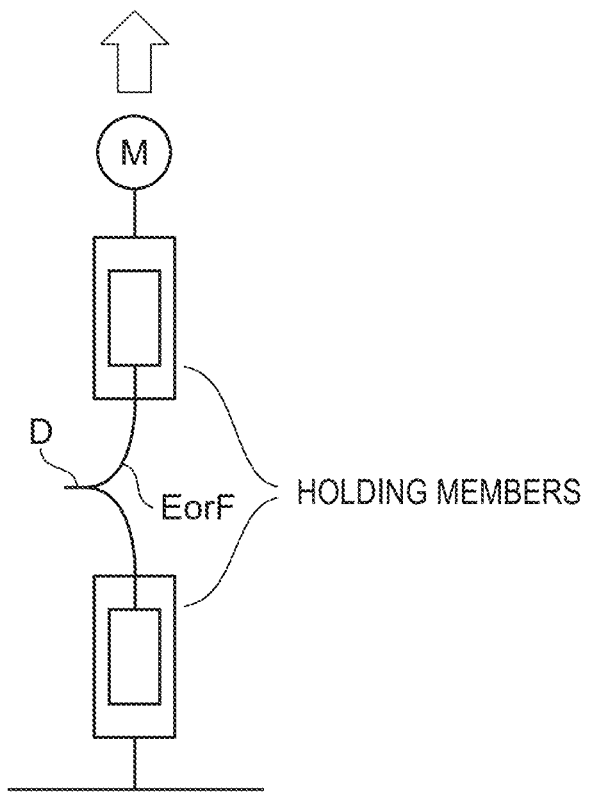

Next, as illustrated in FIG. 12C, one end of the test strip E or F was held by an upper holding member, and the other end thereof was held by a lower holding member. A digital force gauge M (FGP-2, manufactured by Nidec-Shimpo Corporation) was connected to the upper holding member. After that, the digital force gauge was pulled up gradually, a tearing force at the time of the bonded portion D becoming torn apart was measured using the digital force gauge, and the peak value of the tearing force was recorded. The measurement was conducted five times each, and the average value was taken as the booklet bonding strength of the bonded portion D. The author's study confirmed that desirable bonding strength of a booklet, for a practical application, is 1.0 N/cm or greater per unit distance in the width direction of a test strip; therefore, 1.0 N/cm was adopted as a quality determination threshold, and a case of being greater than or equal to this value was determined as "booklet strength OK", and a case of being less than this value was determined as "booklet strength not OK". The reason why the strength of bonding between the sheet S19 and the sheet S20 was measured for each of the sheet sizes is that, especially in the A5-size paper, the concentration of stress onto the heating plate by the sheet edge portion tends to be significant when the sheet stack has a certain degree of thickness. In the booklet strength measurement performed this time, for the A4-size paper, the adhesive power of the test strip E12 among the test strips E1 to E14 described above was measured. This is because the twelfth test strip corresponds to the R2 position where there is a concern about the close-contact property of the pressing plate 169 and the ceramic heater 168 as described earlier. For the A5-size paper, the adhesive power of the test strip F5 at the center portion among the test strips F1 to F10 described above was measured as a representative value.

Present Embodiment

With regard to the setting temperature of the thermistor TH, the setting temperature for the A5-size paper (150° C.) was set to be lower than the setting temperature for the A4-size paper (220° C.). With regard to the duration of the pressing, the pressing time for the A5-size paper (5.0 sec.) was set to be longer than the pressing time for the A4-size paper (3.0 sec.) The total pressing force was 30 kgf for both the A4-size paper and the A5-size paper. With regard to the booklet bonding strength, for both the A4-size paper and the A5-size paper, the initial booklet strength and the after-durability booklet strength were greater than the reference value (1.0 N/cm) of the bonding strength, meaning good adhesive power. This is because, by making the setting temperature for the A5-size paper lower, it is possible to suppress the plastic deformation of the pressing plate 169 and thus ensure good close-contact property of the pressing plate 169 and the ceramic heater 168 even after the durability test. Consequently, even when A4 booklet creation is performed after the durability use by A5 booklet creation, the temperature at the region R1 of the pressing plate 169 is not lower than the temperature around this region, and it is possible to apply sufficient heat to the booklet and thus obtain good adhesive power. Moreover, though the setting temperature for the A5-size paper is lower than the setting temperature for the A4-size paper, it is possible to apply an equivalent quantity of heat to the booklet by making the pressing time for the A5-size paper longer than the pressing time for the A4-size paper. Therefore, both good initial adhesive power and good after-durability adhesive power are obtained also for the A5-size paper.

First Comparative Example

The same total pressing force, setting temperature, and pressing time of the thermistor TH were set for the A4-size paper and the A5-size paper. The total pressing force was 30 kgf. The setting temperature was 220° C. The pressing time was 3.0 sec. With regard to the booklet bonding strength, for both the A4-size paper and the A5-size paper, the initial booklet strength was greater than the reference value (1.0 N/cm) of the bonding strength, meaning good adhesive power. On the other hand, after-durability adhesive power for the A4-size paper was low. This is because, since the setting temperature for the A5-size paper was high (220° C.) without being made lower than the setting temperature for the A4-size paper, the plastic deformation of the pressing plate 169 was significant, resulting in a decrease in the close-contact property of the pressing plate 169 and the ceramic heater 168. Consequently, the temperature at the region R1 of the pressing plate 169 became lower than the temperature around this region, making it impossible to apply sufficient heat to the booklet, resulting in a decrease in adhesive power.

Second Comparative Example

The setting temperature was changed to 150° C. from that of the first comparative example. The total pressing force was 30 kgf. The pressing time was 3.0 sec. The conditions were the same both for the A4-size paper and the A5-size paper. The booklet bonding strength under the initial conditions was less than the reference value (1.0 N/cm) of the bonding strength both for the A4-size paper and the A5-size paper, meaning insufficient adhesive power. This resulted from insufficient applying of heat to the booklet, due to the influence of a decrease in setting temperature, resulting in a decrease in adhesive power. Since the initial adhesiveness is poor, description of the test result of after-durability booklet bonding strength is omitted.

Third Comparative Example

The total pressing force was changed to 20 kgf from that of the first comparative example. The setting temperature was 220° C. The pressing time was 3.0 sec. The conditions were the same both for the A4-size paper and the A5-size paper. The booklet bonding strength under the initial conditions was less than the reference value (1.0 N/cm) of the bonding strength both for the A4-size paper and the A5-size paper, meaning insufficient adhesive power. This resulted from insufficient applying of pressure to the booklet, due to the influence of a decrease in total pressing force, resulting in a decrease in sheet-to-sheet close-contact property and thus a decrease in adhesive power. Since the initial adhesiveness is poor, description of the test result of after-durability booklet bonding strength is omitted.

First Variation Example

This is a variation example of the present embodiment. The setting temperature was the same for the A4-size paper and the A5-size paper (220° C.). On the other hand, the total pressing force for the A5-size paper (20 kgf) was set to be less than the total pressing force for the A4-size paper (30 kgf). The pressing time for the A5-size paper (7.0 sec.) was set to be longer than the pressing time for the A4-size paper (3.0 sec.) With regard to the booklet bonding strength, for both the A4-size paper and the A5-size paper, the initial booklet strength and the after-durability booklet strength were greater than the reference value (1.0 N/cm) of the bonding strength, meaning good adhesive power. This is because, by making the total pressing force for the A5-size paper less, it is possible to suppress the plastic deformation of the pressing plate 169 and thus ensure good close-contact property of the pressing plate 169 and the ceramic heater 168 even after the durability test. Consequently, the temperature at the region R2 of the pressing plate 169 is not lower than the temperature around this region, and it is possible to apply sufficient heat to the booklet. Moreover, though the sheet-to-sheet close-contact property decreases due to setting the total pressing force for the A5-size paper less than the total pressing force for the A4-size paper, it is possible to heat the booklet sufficiently by making the pressing time for the A5-size paper longer than the pressing time for the A4-size paper, thereby obtaining both good initial adhesive power and good after-durability adhesive power. The method for keeping good adhesive bonding property of a booklet even with a decrease in heating temperature is not limited to making the pressing time longer. For example, heat quantity required for adhesive bonding may be reduced by reducing the number of sheets bonded together at a time. For example, the number of sheets bonded together at a time may be reduced from five to three. The plastic deformation of the pressing plate may be suppressed by reducing both the heating temperature and the pressing force.

As explained above, according to the present embodiment, in a heating-and-pressing unit that supports a plurality of sheet sizes and is configured to create a booklet, a setting temperature of a ceramic heater for each sheet size or a pressing force of a pressing member for each sheet size is controlled properly. This makes it possible to suppress plastic deformation of a heating plate and keep good adhesive bonding property of a booklet. In particular, with regard to the setting temperature of the ceramic heater, it is possible to suppress the plastic deformation of the heating plate by setting the setting temperature of minimum-size paper lower than the setting temperature of maximum-size paper. With regard to the total pressing force of the heating-and-pressing unit, it is possible to suppress the plastic deformation of the heating plate by setting the total pressing force of minimum-size paper less than the total pressing force of maximum-size paper.

Though A4 has been described as the maximum size and A5 has been described as the minimum size in the present embodiment, this does not imply any limitation. With regard to the setting temperature of the thermistor TH, for example, also for B5-size paper, it is possible to suppress the plastic deformation of the heating plate by applying thereto a setting temperature that is lower than the setting temperature for the maximum size, A4. Also with regard to the total pressing force of the heating-and-pressing unit, for B5-size paper, it is possible to suppress the plastic deformation of the heating plate by applying thereto a pressing force that is less than the pressing force for the maximum size, A4.

ADDITIONAL REMARKS

The embodiment having been described above discloses at least the following booklet creating apparatus and the following image forming system.

(Item 1) A booklet creating apparatus includes:
a heating-and-pressing unit configured to heat and press adhesive layer in a state in which plural sheets, with the adhesive layer formed thereon, are stacked, the heating-and-pressing unit including
a pressing plate configured to be brought into contact with the sheets and press the sheets;
a heating entity configured to heat the pressing plate at a predetermined temperature;
a receiving member facing the pressing plate; and
a pressing mechanism configured to apply pressure to the sheets sandwiched between the pressing plate and the receiving member; and
a controller configured to control the predetermined temperature and the pressure, wherein
the booklet creating apparatus creates a booklet by sandwiching the sheets with the adhesive layer formed thereon between the pressing plate and the receiving member and by heating and pressing the adhesive layer formed on the sheets, and
the controller performs control in such a way as to make the predetermined temperature and/or the pressure lower when heating and pressing sheets of minimum size than when heating and pressing sheets of maximum size.

(Item 2)
In the booklet creating apparatus according to item 1,
the controller controls a pressing time of the pressing mechanism when heating and pressing the sheets, and the controller controls the pressing time to be longer when heating and pressing the sheets of minimum size than when heating and pressing the sheets of maximum size.

(Item 3)
In the booklet creating apparatus according to item 1 or 2,
the booklet creating apparatus performs the heating and the pressing such that a number of sheets for which the adhesive layer is heated and pressed at a time is smaller when heating and pressing the sheets of minimum size than when heating and pressing the sheets of maximum size.

(Item 4) An image forming system includes:
the booklet creating apparatus according to any one of items 1 to 3; and
an image forming apparatus configured to form the adhesive layer on the sheets.

The present disclosure makes it possible to provide a booklet creating apparatus and an image forming system that suppress, in a heating-and-pressing unit that supports a plurality of sheet sizes, plastic deformation of a pressing plate, and thus keep good adhesive bonding property of a booklet.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-200408, filed on Nov. 28, 2023, which is hereby incorporated by reference herein in its entirety.

What is claimed is:

1. A booklet creating apparatus, comprising:
a heating-and-pressing unit configured to heat and press adhesive layer in a state in which plural sheets, with the adhesive layer formed thereon, are stacked, the heating-and-pressing unit including
a pressing plate configured to be brought into contact with the sheets and press the sheets;
a heating entity configured to heat the pressing plate at a predetermined temperature;
a receiving member facing the pressing plate; and
a pressing mechanism configured to apply pressure to the sheets sandwiched between the pressing plate and the receiving member; and
a controller configured to control the predetermined temperature and the pressure, wherein
the booklet creating apparatus creates a booklet by sandwiching the sheets with the adhesive layer formed thereon between the pressing plate and the receiving member and by heating and pressing the adhesive layer formed on the sheets, and
the controller performs control in such a way as to make the predetermined temperature and/or the pressure lower when heating and pressing sheets of minimum size than when heating and pressing sheets of maximum size.

2. The booklet creating apparatus according to claim 1, wherein
the controller controls a pressing time of the pressing mechanism when heating and pressing the sheets, and the controller controls the pressing time to be longer when heating and pressing the sheets of minimum size than when heating and pressing the sheets of maximum size.

3. The booklet creating apparatus according to claim 1, wherein the booklet creating apparatus performs the heating and the pressing such that a number of sheets for which the adhesive layer is heated and pressed at a time is smaller when heating and pressing the sheets of minimum size than when heating and pressing the sheets of maximum size.

4. An image forming system, comprising:

the booklet creating apparatus comprising:
- a heating-and-pressing unit configured to heat and press adhesive layer in a state in which plural sheets, with the adhesive layer formed thereon, are stacked, the heating-and-pressing unit including
  - a pressing plate configured to be brought into contact with the sheets and press the sheets;
  - a heating entity configured to heat the pressing plate at a predetermined temperature;
  - a receiving member facing the pressing plate; and
  - a pressing mechanism configured to apply pressure to the sheets sandwiched between the pressing plate and the receiving member;
- a controller configured to control the predetermined temperature and the pressure,
- wherein the booklet creating apparatus creates a booklet by sandwiching the sheets with the adhesive layer formed thereon between the pressing plate and the receiving member and by heating and pressing the adhesive layer formed on the sheets, and
- wherein the controller performs control in such a way as to make the predetermined temperature and/or the pressure lower when heating and pressing sheets of minimum size than when heating and pressing sheets of maximum size; and an image forming apparatus configured to form the adhesive layer on the sheets.

5. The booklet creating apparatus according to claim 1, wherein the controller performs the control such that the pressure applied when heating and pressing the sheets of maximum size and the pressure applied when heating and pressing the sheets of minimum size are equal to each other and such that the predetermined temperature applied when heating and pressing the sheets of minimum size is lower than the predetermined temperature applied when heating and pressing the sheets of maximum size.

6. The booklet creating apparatus according to claim 1, wherein the controller performs the control such that the predetermined temperature applied when heating and pressing the sheets of maximum size and the predetermined temperature applied when heating and pressing the sheets of minimum size are equal to each other and such that the pressure applied when heating and pressing the sheets of minimum size is lower than the pressure applied when heating and pressing the sheets of maximum size.

7. The booklet creating apparatus according to claim 1, wherein the heating entity and the pressing plate are in contact with each other.

8. The booklet creating apparatus according to claim 1, wherein the pressing plate is an aluminum member and includes a protruding portion in a direction in which the pressing plate is brought closer to the receiving member when heating and pressing the sheets.

9. The booklet creating apparatus according to claim 1, wherein one end of the sheets in a direction in which the sheets are conveyed onto the heating-and-pressing unit when heating and pressing the sheets of maximum size and one end of the sheets in the direction in which the sheets are conveyed onto the heating-and-pressing unit when heating and pressing the sheets of minimum size lie at a same position.

10. The booklet creating apparatus according to claim 1, wherein the adhesive layer is formed of a toner.

* * * * *